(12) United States Patent
Lu

(10) Patent No.: US 9,392,069 B2
(45) Date of Patent: Jul. 12, 2016

(54) PROMOTING INTEROPERABILITY OF PRESENCE-BASED SYSTEMS THROUGH THE USE OF UBIQUITOUS ONLINE IDENTITIES

(75) Inventor: Larry L. Lu, Great Falls, VA (US)

(73) Assignee: AOL Inc., Dulles, VA (US)

( * ) Notice: Subject to any disclaimer, the term of this patent is extended or adjusted under 35 U.S.C. 154(b) by 1355 days.

(21) Appl. No.: 11/561,880

(22) Filed: Nov. 20, 2006

(65) Prior Publication Data
US 2007/0156826 A1 Jul. 5, 2007

Related U.S. Application Data

(60) Provisional application No. 60/737,755, filed on Nov. 18, 2005.

(51) Int. Cl.
| | |
|---|---|
| H04L 29/08 | (2006.01) |
| H04L 12/58 | (2006.01) |
| G06Q 10/10 | (2012.01) |
| H04N 21/436 | (2011.01) |
| H04M 7/00 | (2006.01) |
| H04L 29/06 | (2006.01) |

(52) U.S. Cl.
CPC .............. *H04L 67/22* (2013.01); *G06Q 10/107* (2013.01); *H04L 12/581* (2013.01); *H04L 12/5815* (2013.01); *H04L 51/04* (2013.01); *H04L 63/0815* (2013.01); *H04L 67/24* (2013.01); *H04L 12/582* (2013.01); *H04L 12/5855* (2013.01); *H04L 63/0807* (2013.01); *H04M 7/0045* (2013.01); *H04N 21/43615* (2013.01)

(58) Field of Classification Search
CPC ....................................... H04L 67/22
USPC ........................................................ 709/204
See application file for complete search history.

(56) References Cited

U.S. PATENT DOCUMENTS

| | | | |
|---|---|---|---|
| 5,745,767 A * | 4/1998 | Rosen ................. | G06F 11/3684 714/E11.208 |
| 6,175,854 B1 | 1/2001 | Bretscher | |
| 6,370,564 B2 | 4/2002 | Bretscher | |
| 6,430,604 B1 | 8/2002 | Ogle et al. | |
| 6,505,238 B1 | 1/2003 | Tran | |
| 6,714,793 B1 * | 3/2004 | Carey ..................... | H04L 51/04 455/412.1 |
| 6,807,423 B1 | 10/2004 | Armstrong et al. | |
| 7,248,677 B2 | 7/2007 | Randall et al. | |
| 7,249,161 B2 | 7/2007 | Srinivas et al. | |
| 7,272,634 B2 | 9/2007 | Clement et al. | |
| 7,308,579 B2 | 12/2007 | Abela | |

(Continued)

OTHER PUBLICATIONS

Tran et al., "Consumption of Multiple Concurrent Identities: The Need From the Instant Messaging Virtual Community", 2004.*

(Continued)

*Primary Examiner* — Ondrej C Vostal
(74) *Attorney, Agent, or Firm* — Finnegan, Henderson, Farabow, Garrett & Dunner LLP

(57) ABSTRACT

Access to a first instant messaging service using an online identity that is associated with a second instant messaging service is enabled. A profile is accessed. The profile indicates that another instant messaging service is to be provided with presence information regarding the use of the online identity to access the first instant messaging service. The other instant messaging service is provided with the presence information regarding the use of the online identity to access the first instant messaging service.

39 Claims, 35 Drawing Sheets

(56) References Cited

U.S. PATENT DOCUMENTS

| | | | |
|---|---|---|---|
| 7,359,938 B1 | 4/2008 | Davies et al. | |
| 7,376,670 B2 | 5/2008 | Badt, Jr. et al. | |
| 7,421,732 B2 | 9/2008 | Costa-Requena et al. | |
| 7,450,531 B2* | 11/2008 | Iyer | H04L 12/14 370/310 |
| 7,487,248 B2 | 2/2009 | Moran et al. | |
| 7,526,563 B2 | 4/2009 | Ingimundarson et al. | |
| 7,536,437 B2 | 5/2009 | Zmolek | |
| 7,539,291 B2 | 5/2009 | D'Angelo et al. | |
| 7,603,411 B1* | 10/2009 | Davies | H04M 3/42 370/349 |
| 7,603,467 B2* | 10/2009 | Malik | H04L 12/581 709/204 |
| 7,657,597 B2* | 2/2010 | Arora | H04L 51/04 707/830 |
| 7,673,001 B1 | 3/2010 | Battle et al. | |
| 7,848,501 B2* | 12/2010 | Goodman | G06F 21/316 379/201.01 |
| 7,983,228 B1* | 7/2011 | Choksi | H04L 65/4061 370/338 |
| 8,015,019 B1* | 9/2011 | Smith | G06F 17/3089 705/1.1 |
| 8,218,735 B2 | 7/2012 | Brunson et al. | |
| 8,396,922 B2 | 3/2013 | Lu | |
| 8,584,258 B2* | 11/2013 | La Rotonda | G06Q 10/10 709/203 |
| 2002/0065894 A1* | 5/2002 | Dalal | H04L 12/581 709/206 |
| 2003/0002633 A1 | 1/2003 | Kredo et al. | |
| 2003/0018726 A1 | 1/2003 | Low et al. | |
| 2003/0037103 A1* | 2/2003 | Salmi | G06F 21/6245 709/203 |
| 2003/0131061 A1 | 7/2003 | Newton et al. | |
| 2003/0154293 A1* | 8/2003 | Zmolek | H04L 63/08 709/228 |
| 2003/0212791 A1 | 11/2003 | Pickup | |
| 2003/0220976 A1 | 11/2003 | Malik | |
| 2003/0220977 A1* | 11/2003 | Malik | H04L 12/1813 709/206 |
| 2004/0030750 A1* | 2/2004 | Moore | G10L 15/265 709/204 |
| 2004/0059781 A1 | 3/2004 | Yoakum et al. | |
| 2004/0068574 A1 | 4/2004 | Costa Requena et al. | |
| 2004/0078447 A1 | 4/2004 | Malik et al. | |
| 2004/0083297 A1 | 4/2004 | Gazzetta et al. | |
| 2004/0088546 A1 | 5/2004 | Shah et al. | |
| 2004/0133641 A1 | 7/2004 | McKinnon et al. | |
| 2004/0148326 A1* | 7/2004 | Nadgir | G06F 9/5072 709/200 |
| 2004/0172279 A1 | 9/2004 | Carolan et al. | |
| 2004/0177134 A1 | 9/2004 | Lonnfors et al. | |
| 2004/0196315 A1* | 10/2004 | Swearingen | G06Q 10/107 715/804 |
| 2004/0215721 A1 | 10/2004 | Szeto et al. | |
| 2004/0243832 A1 | 12/2004 | Wilf et al. | |
| 2004/0264456 A1* | 12/2004 | Beckmann | H04L 29/06 370/389 |
| 2005/0009517 A1* | 1/2005 | Maes | 455/432.1 |
| 2005/0015506 A1 | 1/2005 | Padborg | |
| 2005/0021651 A1 | 1/2005 | Fellenstein et al. | |
| 2005/0033852 A1 | 2/2005 | Tenhunen | |
| 2005/0037762 A1 | 2/2005 | Gurbani et al. | |
| 2005/0044144 A1* | 2/2005 | Malik | H04L 12/581 709/205 |
| 2005/0044423 A1 | 2/2005 | Mellmer et al. | |
| 2005/0050152 A1 | 3/2005 | Penner et al. | |
| 2005/0117525 A1* | 6/2005 | Poustchi | H04L 29/12264 370/254 |
| 2005/0138124 A1 | 6/2005 | Klassen et al. | |
| 2005/0144246 A1 | 6/2005 | Malik | |
| 2005/0164686 A1 | 7/2005 | Bushnell et al. | |
| 2005/0169446 A1* | 8/2005 | Randall | H04M 1/576 379/93.23 |
| 2005/0170847 A1 | 8/2005 | Karlsson et al. | |
| 2005/0172033 A1 | 8/2005 | Matthew et al. | |
| 2005/0177505 A1 | 8/2005 | Keeling et al. | |
| 2005/0210112 A1 | 9/2005 | Clement et al. | |
| 2005/0210113 A1 | 9/2005 | Kasuga et al. | |
| 2005/0216550 A1* | 9/2005 | Paseman et al. | 709/202 |
| 2005/0221807 A1* | 10/2005 | Karlsson | H04M 3/42 455/418 |
| 2005/0227711 A1 | 10/2005 | Orwant et al. | |
| 2005/0228680 A1 | 10/2005 | Malik | |
| 2005/0265318 A1 | 12/2005 | Khartabil et al. | |
| 2005/0267984 A1 | 12/2005 | Costa-Requena et al. | |
| 2005/0289470 A1 | 12/2005 | Pabla et al. | |
| 2006/0026288 A1* | 2/2006 | Acharya | G06Q 10/10 709/227 |
| 2006/0045042 A1* | 3/2006 | Sethi | H04L 12/581 370/328 |
| 2006/0045124 A1 | 3/2006 | Dahlstrom et al. | |
| 2006/0075139 A1 | 4/2006 | Jungck | |
| 2006/0083192 A1 | 4/2006 | Dinescu et al. | |
| 2006/0129643 A1 | 6/2006 | Nielson et al. | |
| 2006/0153346 A1 | 7/2006 | Gonen et al. | |
| 2006/0168015 A1 | 7/2006 | Fowler | |
| 2006/0168060 A1* | 7/2006 | Briand | G06Q 10/107 709/206 |
| 2006/0265508 A1* | 11/2006 | Angel | H04L 29/12047 709/230 |
| 2006/0291378 A1 | 12/2006 | Brotherston et al. | |
| 2007/0027930 A1* | 2/2007 | Alvarado | G06Q 10/109 |
| 2007/0043692 A1* | 2/2007 | Oh | H04W 4/00 |
| 2007/0100944 A1 | 5/2007 | Ford et al. | |
| 2007/0106806 A1 | 5/2007 | Tu et al. | |
| 2007/0141988 A1* | 6/2007 | Kuehnel | H04W 8/005 455/41.2 |
| 2007/0143227 A1 | 6/2007 | Kranzley et al. | |
| 2007/0156827 A1 | 7/2007 | Lu | |
| 2007/0162555 A1 | 7/2007 | Lu | |
| 2007/0162600 A1 | 7/2007 | Lu et al. | |
| 2007/0192140 A1* | 8/2007 | Gropper | G06Q 50/24 705/3 |
| 2008/0059627 A1* | 3/2008 | Hamalainen | H04L 12/5815 709/224 |
| 2008/0168566 A1 | 7/2008 | Malik | |
| 2009/0132726 A1 | 5/2009 | Daniell et al. | |
| 2009/0144429 A1 | 6/2009 | Astrom | |
| 2013/0185358 A1 | 7/2013 | Lu | |
| 2013/0272512 A1 | 10/2013 | Gonen et al. | |

OTHER PUBLICATIONS

Vogiazou, "Wireless Presence and Instant Messaging", 2002.*
Lieberman, "Instant Messaging Interoperability Moves Forward; Jabber, Inc. Announces XMPP-to-SIP Gateway", 2004.*
Jabber Software Foundation, "Jabber User Guide", 2004.*
Pittfield et al., "Microsoft Lync Server 2010", "Interoperability with XMPP Systems Using the XMPP Gateway", 2011.*
Adium, "List of services supported and their interoperability", 2016.*
Saint-Andre, "Streaming XML with Jabber/XMPP", 2005.*
Malik et al., "Instant messaging architecture and system for interoperability and presence management", WO2003094011 A1, 2003.*
Miller et al., "XEP-0220: Server Dialback", 2014.*
Saint-Andre, "Extensible Messaging and Presence Protocol (XMPP): Core", RFC 6120, 2011.*
Dusseault et al., "Guidance on Interoperation and Implementation Reports for Advancement to Draft Standard", RFC 5657, 2009.*
Saint-Andre, "Mapping the Exensible Messaging and Presence Protocol (XMPP) to Common Presence and Instant Messaging (CPIM)", RFC 3922, 2004.*
Saint-Andre, "Extensible Messaging and Presence Protocol (XMPP): Core", RFC 3920, 2004.*
Peterson, "Common Profile for Instant Messaging (CPIM)", RFC 3860, 2004.*
Klensin, "Simple Mail Transfer Protocol", RFC 2821, 2001.*
Day et al., "Instant Messaging / Presence Protocol Requirements", RFC 2779, 2000.*
Day et al., "A Model for Presence and Instant Messaging", RFC 2778, 2000.*

(56) References Cited

OTHER PUBLICATIONS

International Search Report and Written Opinion issued in PCT Application No. PCT/US06/44884 mailed Feb. 26, 2008, 15 pages.
Office Action issued in U.S. Appl. No. 11/561,882 on Apr. 7, 2009, 21 pages.
Office Action issued in U.S. Appl. No. 11/561,886 on Apr. 15, 2009, 30 pages.
Office Action issued in U.S. Appl. No. 11/561,877 on May 1, 2009, 52 pages.
Office Action issued in U.S. Appl. No. 11/561,886 on Oct. 29, 2009, 25 pages.
Final Office Action issued in U.S. Appl. No. 11/561,882 on Nov. 23, 2009, 19 pages.
Final Office Action issue in U.S. Appl. No. 11/561,877 on Dec. 9, 2009, 49 pages.
"Domain", TechTerms.com [online]. Retrieved on Jan. 16, 2013, p. 1.
Allocchio, "GSTN Address Element Extensions in E-mail Services" Standards Track Memo; The Internet Society, RFC 2846 (2000) (33 pages).
Bryan et al., "Standards-based P2P communications systems" Proceedings of the 2005 Virginia Space Grant Consortium Research Conference, Apr. 2005 (10 pages).
Crocker et al., "Common Presence and Instant Messaging (CPIM)" (2011) (20 pages).
Day et al., "A Model for Presence and Instant Messaging," Informational Memo; The Internet Society, RFC 2778 (2000) (16 pages).
Day et al., "Instant Messaging/Presence Protocol Requirements" Informational Memo; The Internet Society, RFC 2279 (2000) (25 pages).
Klyne et al., "Common Presence and Instant Messaging (CPIM): Message Format" Standards Track Memo; The Internet Society, RFC 3862 (2004) (30 pages).
Mahy, "A Message Summary and Message Waiting Indication Event Package for the Session Initiation Protocol (SIP)" Standards Track Memo; The Internet Society, RFC 3842 (2004) (18 pages).
Open Mobile Alliance, "Presence SIMPLE Specification," Candidate Version 1.0—Mar. 17, 2005 (98 pages).
Peterson, "Common Profile for Instant Messaging (CPIM)" Standards Track Memo; The Internet Society, RFC 3860 (2004) (13 pages).
Rosenberg, "A Presence Event Package for the Session Initiation Protocol (SIP)", RFC 3856, (2004) (27 pages).

Sugano et al., "Presence Information Data Format (PIDF)" Standards Track Memo; The Internet Society, RFC 3863 (2004) (27 pages).
U.S. Appl. No. 11/561,877, filed Nov. 20, 2006 by Lu: Advisory Action, Mar. 23, 2010 (3 pages).
U.S. Appl. No. 11/561,877, filed Nov. 20, 2006 by Lu: Non-Final Office Action, Aug. 24, 2010 (58 pages).
U.S. Appl. No. 11/561,877, filed Nov. 20, 2006 by Lu: Final Office Action, Feb. 15, 2011 (50 pages).
U.S. Appl. No. 11/561,877, filed Nov. 20, 2006 by Lu: Non-Final Office Action, Nov. 14, 2011 (58 pages).
U.S. Appl. No. 11/561,877, filed Nov. 20 2006 by Lu: Final Office Action, Apr. 25, 2012 (65 pages).
U.S. Appl. No. 11/561,877, filed Nov. 20, 2006 by Lu: Non-Final Office Action, Aug. 3, 2012 (44 pages).
U.S. Appl. No. 11/561,877, filed Nov. 20, 2006 by Lu: Final Office Action, Jan. 17, 2013 (46 pages).
U.S. Appl. No. 11/561,877, filed Nov. 20, 2006 by Lu: Non-Final Office Action, Nov. 18, 2013 (17 pages).
U.S. Appl. No. 11/561,880, filed Nov. 20, 2006 by Lu et al.: Advisory Action, Mar. 5, 2010 (3 pages).
U.S. Appl. No. 11/561,882, filed Nov. 20, 2006 by Lu: Non-Final Office Action, Apr. 12, 2011 (22 pages).
U.S. Appl. No. 11/561,882, filed Nov. 20, 2006 by Lu: Non-Final Office Action, Oct. 7, 2011 (21 pages).
U.S. Appl. No. 11/561,882, filed Nov. 20, 2006 by Lu: Notice of Allowance, Jul. 23, 2012 (16 pages).
U.S. Appl. No. 11/561,882, filed Nov. 20, 2006 by Lu: Notice of Allowance, Jul. 5, 2012 (12 pages).
U.S. Appl. No. 11/561,882, filed Nov. 20, 2006 by Lu: Notice of Allowance, May 23, 2012 (11 pages).
U.S. Appl. No. 11/561,882, filed Nov. 20, 2006 by Lu: Notice of Allowance, Nov. 5, 2012 (25 pages).
U.S. Application No. 11/561,886: Final Office Action, Aug. 4, 2010 (24 pages).
U.S. Appl. No. 11/561,886: Advisory Action, Nov. 17, 2010 (2 pages).
U.S. Appl. No. 11/561,886: Non-Final Office Action, Jul. 2, 2012 (24 pages).
U.S. Application No. 11/561,886: Final Office Action, Jan. 24, 2013 (25 pages).
U.S. Appl. No. 11/561,886: Examiner's Answer to Appeal Brief, Oct. 15, 2013 (24 pages).
U.S. Appl. No. 13/786,350, filed Mar. 5, 2013 by Lu: Non-Final Office Action, Nov. 27, 2013 (9 pages).

* cited by examiner

500 time you sign in

*Birth Date: [mm ▼] [dd ▼] [yyyy]

*Gender: ○ Female ○ Male

*Country: [Choose One ▼]

*ZIP Code: [           ]

In Case You Forget Your Password:

*Alternate E-mail Address: [           ]

*e.g., johndoe@domain_name.com*

Terms of Service
By typing the characters shown below and clicking the Submit button, you acknowledge receipt of, and agree and consent to, the AOL Network's Terms of Service and Privacy Policy. You also agree to transact with us and receive required notices electronically. Click the Cancel button below if you do not agree to any of these terms.

Last Step: Security Check
*(This test prevents registration fraud)*

*Enter a credit card number: [           ]

[ SUBMIT ]    [ CANCEL ]

FIG. 5

(LOCAL AUTHENTICATION, LOCAL LIST, LOCAL PUBLICATION)

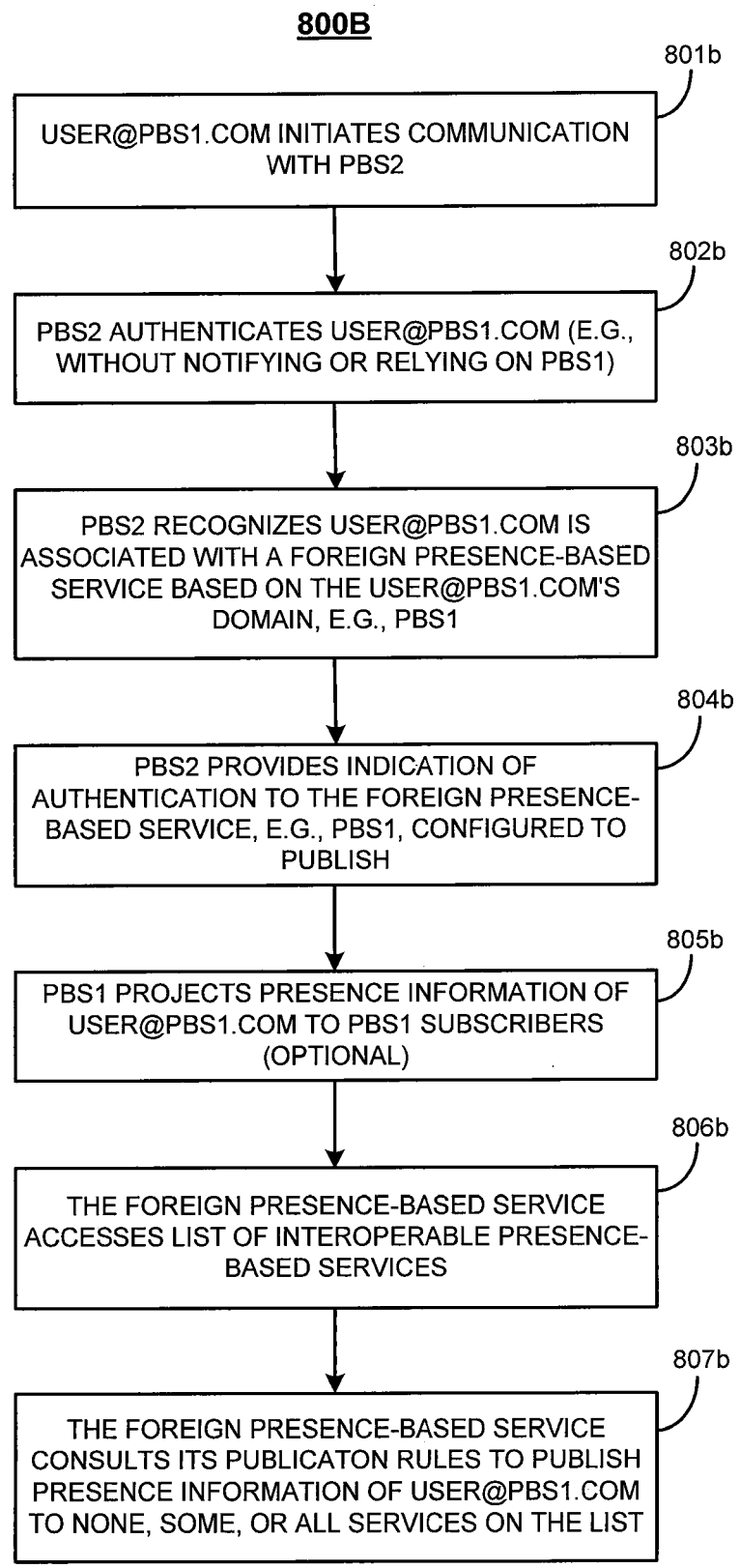
FIG. 8B (LOCAL AUTHENTICATION, FOREIGN LIST, FOREIGN PUBLICATON)

(LOCAL AUTHENTICATION, FOREIGN LIST, LOCAL PUBLICATION)

(FOREIGN AUTHENTICATION, FOREIGN LIST, FOREIGN PUBLICATION)

(FOREIGN AUTHENTICATION, LOCAL LIST, FOREIGN PUBLICATION)

(FOREIGN AUTHENTICATION, LOCAL LIST, LOCAL PUBLICATION)

1000

| USERNAME | REF ID | SYSTEM AT LOGIN |
|---|---|---|
| USER@PBS1.COM | 86 | PBS2 |
| USER@XYZ.COM | 80 | PBS2 |
| | | |

(OPERATIONAL ACTIONS PERFORMED BY PBS2 TO AUTHORIZE COMPUTER ACCESS TO PBS2 SERVICE)

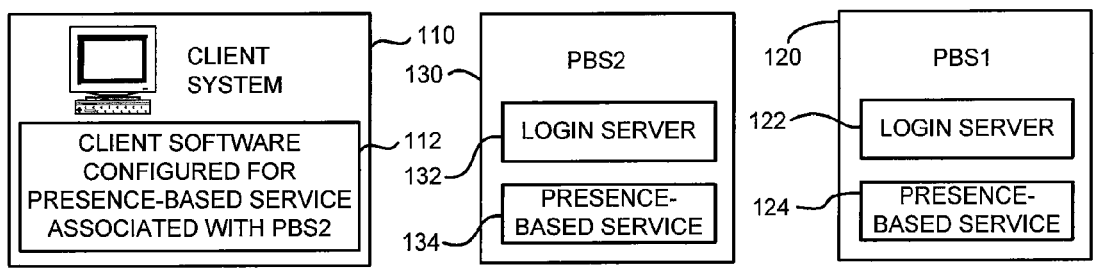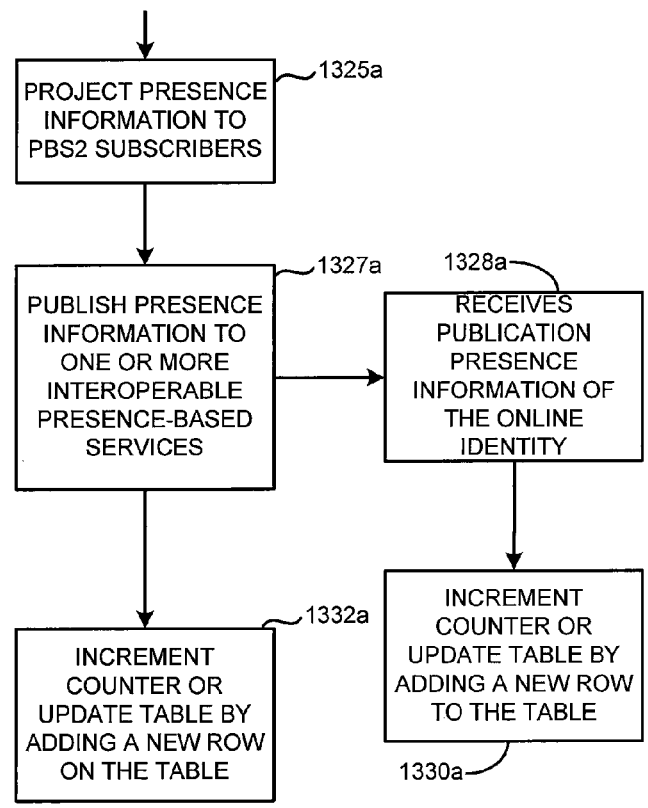
FIG. 13B

(OPERATIONAL ACTIONS PERFORMED BY PBS1)

2000

Traffic Delivery Rules Database

- Interoperable presence-based systems
  - All
  - Some
  - None
- Selected subset of online identities for either or all interoperable presence-based systems
- A particular device type
  - Client mobile device
  - client system
- A particular device type at a particular time of day
  - Client mobile device between 7am-9am and 4pm and 6pm
  - client system between 9am-4pm and 6pm -12pm
- Client devices at which the online identity has an active presence
- A particular device according to the priority of the traffic
  - Urgent
  - Normal

FIG. 20

PROMOTING INTEROPERABILITY OF PRESENCE-BASED SYSTEMS THROUGH THE USE OF UBIQUITOUS ONLINE IDENTITIES

CLAIM OF PRIORITY

This application claims priority under 35 USC §119(e) to U.S. Provisional Patent Application Ser. No. 60/737,755, filed on Nov. 18, 2005, the entire contents of which are hereby incorporated by reference.

TECHNICAL FIELD

This disclosure relates to using an online identity to access one or more interoperable presence-based services.

SUMMARY

According to one general aspect, a method according to the present application includes enabling access to a first instant messaging service using an online identity that is associated with a second instant messaging service, accessing a profile that indicates at least one other instant messaging service is to be provided with presence information regarding the use of the online identity to access the first instant messaging service, and providing the other instant messaging service with the presence information regarding the use of the online identity to access the first instant messaging service.

Implementations of the above general aspect may include one or more of the following features. For example, enabling access to the first instant messaging service using the online identity may comprise communicating with the second instant messaging service to authenticate the online identity. The communicating with the second instant messaging service to authenticate the online identity may include communicating with the second instant messaging service to authenticate the online identity without soliciting a user of the online identity.

Alternatively or additionally, enabling access to the first instant messaging service using the online identity may comprise communicating with the first instant messaging service to authenticate the online identity such that the first instant messaging service authenticates the online identity and provides the other presence other instant messaging service with the presence information associated with the online identity. Alternatively or additionally, enabling access to the first instant messaging service using the online identity may comprise sending an authentication ticket to the client device from the second instant messaging service. Alternatively or additionally, enabling access to the first instant messaging service using the online identity may comprise receiving a request for access to the first instant messaging service from a client device, the request including the online identity, authenticating the online identity, and providing the client device with access to the first instant messaging service upon authentication of the online identity.

Implementations of the above general aspect may include one or more of the following features. Accessing the profile may include sending a request for publication rules from the first instant messaging service to the second instant messaging service and receiving the publication rules at the first instant messaging service from the second instant messaging service. Alternatively or additionally, accessing the profile may comprise sending a request for publication rules from the second instant messaging service to the first instant messaging service and receiving the publication rules at the second instant messaging service from the first instant messaging service. Alternatively or additionally, accessing the profile may comprise accessing a locally stored profile. The profile may include more than one instant messaging service, one of which is the first instant messaging service. The at least one other instant messaging service may include the second instant messaging service. The online identity may be expressed using a combination of a username and a domain name.

Alternatively or additionally, accessing the profile may include accessing a list of instant messaging services to be provided with the presence information. Alternatively or additionally, accessing the profile may include accessing a set of publication rules. The profile may be associated with the online identity. The profile further may identify an identity of the instant messaging service that is to be provided with the presence information regarding the user of the online identity to access the first instant messaging service. Determining, from the profile, the other instant messaging service that is to be provided with presence information regarding the use of the online identity to access the first instant messaging service.

Providing the other instant messaging service with the presence information may comprise sending the presence information from the first instant messaging service to the other instant messaging service. Alternatively or additionally, providing the other instant messaging service with the presence information may comprise sending the presence information from the second instant messaging service to the other instant messaging service.

Implementations of the above general aspect may also include one or more of the following features. Providing the presence information to subscribers associated with the first instant messaging service that have subscribed to the presence information. Providing the presence information to subscribers may include providing the presence information to subscribers by the first instant messaging service independent from other instant messaging services. Providing the presence information to subscribers may include providing the presence information to subscribers by the first instant messaging service in response to or at a direction of another instant messaging service. The presence information may include one or more of the following: logging in, logging off, going idle, or going away. Determining that the online identity is associated with the second instant messaging service may include determining that the online identity is registered with the second instant messaging system.

According to another general aspect, a method according to the present application includes receiving a request to access a first instant messaging service, the request including an online identity and determining that the online identity is associated with a second instant messaging service. The method also includes communicating with the second instant messaging service to enable authentication of the online identity and upon authentication of the online identity, enabling access to the first instant messaging service.

Implementations of the above general aspect may include one or more of the following features. For example, the online identity may include a username and a domain name. Determining that that the online identity is associated with the second instant messaging service may include accessing the domain name included in the online identity and determining that the online identity is associated with the second instant messaging service based on the accessed domain name. Accessing the domain name may identify that the online identity is associated with the second instant messaging service. Determining that the online identity is associated with the second instant messaging service based on the accessed domain name may include referencing a table to determine that the online identity is associated with the second instant messaging service, wherein the table associates the accessed domain name with the second instant messaging service.

Alternatively or additionally, determining that the online identity is associated with the second instant messaging service may include determining that the online identity is associated with an account at the second instant messaging service. Alternatively or additionally, determining that the online identity is associated with the second instant messaging service may include determining that the online identity is registered with the second instant messaging service.

Additionally, the request also may include credentials associated with the online identity. Receiving the request to access the first instant messaging service may include receiving, at the client system, the request from a user. Determining that the online identity is associated with the second instant messaging service may include determining, at the client system, that the online identity is associated with the second instant messaging service and communicating with the second instant messaging service to authenticate the online identity may include sending, from the client system, the online identity and credentials to the second instant messaging service and receiving, at the client system, an authentication ticket from the second instant messaging service. Enabling access to the first instant messaging service may include sending, from the client system, the authentication ticket to the first instant messaging service.

The implementations of the above general aspect may also include sending the authentication ticket from the first instant messaging service to the second instant messaging service, requesting verification of the authentication ticket from the second instant messaging service, and receiving a verification message from the second instant messaging service.

Determining that the online identity is associated with the second instant messaging service may include determining that the online identity is associated with the second instant messaging service based on the online identity or the received credentials. Receiving the request to access the first instant messaging service may include receiving, from the client system, the request at the first instant messaging service, determining that the online identity is associated with the second instant messaging service may include determining, at the first instant messaging service, that the online identity is associated with the second instant messaging service, and communicating with the second instant messaging service may include sending an authentication request from the first instant messaging service to the second instant messaging service, and in response to sending the authentication request, receiving, at the first instant messaging service, an indication of authentication from the second instant messaging service; and enabling access to the first instant messaging service may include enabling the client system to access the first instant messaging service. The authentication request may include the online identity and the received credentials.

Implementations of the above general aspect may also include storing the received credentials to enable future authentication of the online identity without sending the authentication request to the second instant messaging service. Receiving the request to access the first instant messaging service may include receiving, from a client system, the request at the first instant messaging service and determining that the online identity is associated with the second instant messaging service may include determining, at the first instant messaging service, that the online identity is associated with the second instant messaging service. Communicating with the second instant messaging service may include requesting, at the first instant messaging service and from the second instant messaging service, credentials associated with the online identity, in response to the request, receiving the requested credentials associated with the online identity at the first instant messaging service from the second instant messaging service, comparing, at the first instant messaging service, the requested credentials to the received credentials from the client system, determining, at the first instant messaging service, whether the requested credentials matches the received credentials from the client system, and authenticating the online identity, at the first instant messaging service, if the requested credentials match the received credentials from the client system. Enabling access to the first instant messaging service may include enabling the client system to access the first instant messaging service.

Implementations of the above general aspect may also storing the requested credentials to enable future authentication of the online identity without requesting the credentials associated with the online identity from the second instant messaging service. Enabling access to the first instant messaging service may include enabling the online identity to share its presence information with at least one other online identity and send an receive instant messages from the at least one other online identity.

Implementations of the described techniques may include hardware, a method or process, or computer software on a computer-accessible medium. The details of one or more implementations are set forth in the accompanying drawings and the description below. Other features will be apparent from the description and drawings, and from the claims.

In another aspect, access to a first instant messaging service using an online identity is allowed. A profile associated with the online identity is accessed and the profile is updated to indicate that the online identity is currently being used to access the first instant messaging service. A message is received from another instant messaging service at the first instant messaging service. The message indicates that the online identity is currently being used to access a second instant messaging service. In response to the message, the profile is updated to indicate that the online identity is currently being used to access the second instant messaging service.

Implementations may include one or more of the following features. For example, allowing access to the first instant messaging service using the online identity may include receiving a request to access the first instant messaging service, the request including the online identity; determining that the online identity is associated with the second instant messaging service; and communicating with the second instant messaging service to authenticate the online identity.

The online identity may be associated with the first instant messaging system or the second instant messaging system. The online identity may be expressed using a combination of a username and a domain name. Updating the profile to indicate that the online identity is currently being used to access the second instant messaging service may include updating a table to include an identity of the second instant messaging system. The table may be updated to include an identity of a client device accessing the second instant messaging service using the online identity. The table also may be updated to include the duration of time the online identity has been used to access the second instant messaging service.

The other instant messaging service may include the second instant messaging service. Updating the profile may include updating a counter that indicates the number of times the online identity is used to access one or more instant messaging services. Updating the profile may include decrementing the counter if it is determined that the online identity has logged off from either the first instant messaging service or the second instant messaging service.

A particular instant messaging service from which the online identity has logged off may be identified and the one or more instant messaging services may be notified that the online identity has logged off the particular instant messaging service. A client device from which the online identity has logged off may be identified and the one or more instant messaging services may be notified that the online identity has logged off the client device.

Whether a value of the counter is equal to zero may be determined; and if so, the one or more instant messaging services may be notified of the online identity's complete loss of presence. Accessing the profile may include accessing a profile maintained by the first instant messaging service.

In another aspect, a message directed to an online identity may be received at a first instant messaging service. It is determined that the online identity has a connection to the first instant messaging service through a second instant messaging service. At the first instant messaging service, traffic delivery rules are accessed. The traffic rules are configured to control delivering of the message and are customized for an individual. At least a portion of the traffic delivery rules and the message are sent to the second instant messaging service, thereby enabling the second instant messaging service to deliver the message to the online identity according to the traffic delivery rules.

Implementations may include one or more of the following features. For example, the online identity may include a user name and a domain. It may be determined that the online identity is associated with the first instant messaging service. Determining that the online identity is associated with the first instant messaging service may include determining that the online identity is associated with an account at the first instant messaging service. Determining that the online identity is associated with the first instant messaging service may include determining that the online identity is registered with the first instant messaging service.

The traffic delivery rules may be customized for the online identity and, as such, the traffic delivery rules may govern receipt of the message based on preferences of the online identity. The traffic delivery rules may be customized for a sender of the message and, as such, the traffic delivery rules may regulate delivery of the message based on preferences of the sender of the message.

It may be determined that the online identity is associated with the second instant messaging service. Determining that the online identity is associated with the second instant messaging service may include determining that the online identity is associated with an account at the second instant messaging service. Determining that the online identity is associated with the second instant messaging service may include determining that the online identity is registered with the first instant messaging service.

Accessing the traffic delivery rules may include accessing traffic delivery rules stored at the first instant messaging service. Accessing the traffic delivery rules may include accessing traffic delivery rules stored at the second instant messaging service. The traffic delivery rules may include instructions for delivery of the message through one or more instant messaging services. The traffic delivery rules may include instructions for delivery of the message based on a type of client device. The traffic delivery rules may include instructions for delivery of the message based on a particular time of day. The traffic delivery rules may include instructions for delivery of the message to a client device at which the online identity has an active presence. The traffic delivery rules may instructions for determining whether the online identity has a direct presence at the first instant messaging service and, in the absence of the direct presence at the first instant messaging service, delivering the message to the online identity through the second instant messaging service. The traffic delivery rules may include instructions for directing the first instant messaging service to deliver the message to the online identity through the second instant messaging service.

Sending at least the portion of the traffic delivery rules and the message to the second instant messaging service may include appending the traffic delivery rules to the message and sending the message with the appended traffic delivery rules to the second instant messaging service. Sending at least the portion of the traffic delivery rules and the message to the second instant messaging service may include sending at least the portion of the traffic delivery rules to the second instant messaging service separate from submitting the message to the second instant messaging service. Sending at least a portion of the traffic delivery rules to the second instant messaging service separate from submitting the message to the second instant messaging service may include resubmitting the traffic delivery rules to the second instant messaging service as the traffic delivery rules changes.

Sending at least the portion of the traffic delivery rules may include sending less than all of the traffic delivery rules to the second instant messaging service. Sending less than all of the traffic delivery rules to the second instant messaging service may include sending less than all of the traffic delivery rules customized for the online identity to the second instant messaging service. Sending less than all of the traffic delivery rules to the second instant messaging service may include sending less than all of the traffic delivery rules customized for a sender of the message to the second instant messaging service.

The individual includes an operator of the online identity or a sender of the message.

In another aspect, a message directed to an online identity may be received from a source at a first instant messaging service. Traffic delivery rules stored at a second instant messaging service are accessed. The traffic delivery rules are configured to control delivering of the message and are customized for an individual. The message is delivered to the online identity according to the traffic delivery rules.

Implementations may include one or more of the following features. For example, It may be determined that the online identity has a connection to the first instant messaging service through a third instant messaging service. The third instant messaging service may access the traffic delivery rules stored at the second instant messaging service and delivers the message to the online identity according to the traffic delivery rules.

The second instant messaging service may be informed of the online identity presence at the third instant messaging service and, in response, receiving, from the second instant messaging service, the traffic delivery rules that are customized for the online identity. The individual may include an operator of a client system using the online identity.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 5 illustrates a registration form that an operator of a client device may complete in order to gain access to a presence-based system.

FIGS. 13A-13B illustrate processes for authenticating and authorizing the operator of the client system of FIG. 12 to access PBS2, projecting changes in presence to PBS2 subscribers, and publishing the changes in presence to PBS1.

FIG. 20 illustrates an example of content within a traffic delivery rules database hosted by a presence-based system.

DETAILED DESCRIPTION

Figure 1:
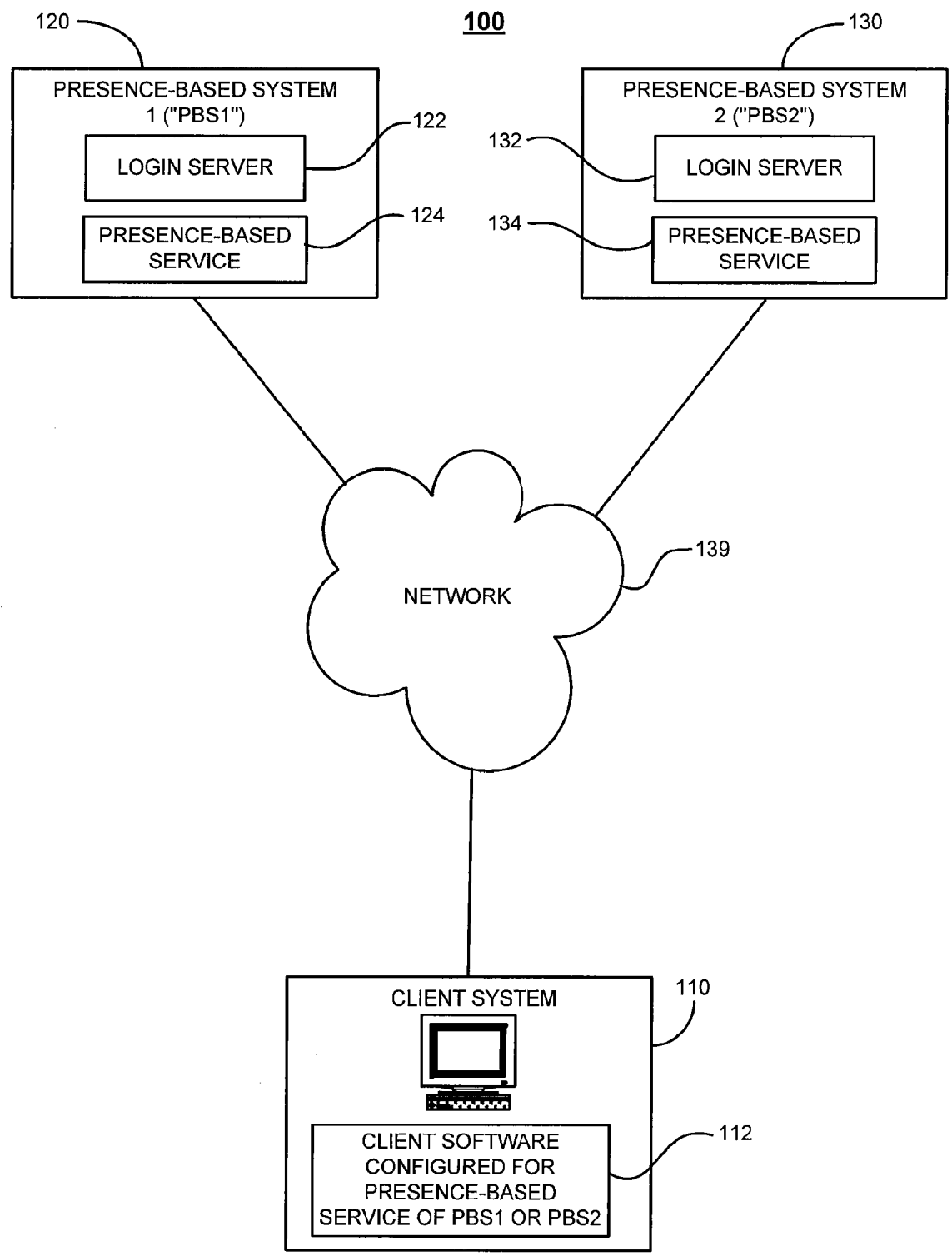
FIG. 1 illustrates an open name space network that includes a client system connected to a first presence-based system ("PBS1") and a second presence-based system ("PBS2") via a network.

Referring generally to FIG. 1, a client system 110 may attempt to access a first presence-based system ("PBS1") 120 operated by a first administrative domain and a second presence-based system ("PBS2") 130 operated by a second, different administrative domain, using an online identity that is included in an open name space. The open name space may include one or more electronic addresses that include a domain name. For example, the online identities may have the form username@domain. For instance, user@PBS1.com may be an online identity associated with PBS1 (e.g., registered with PBS1), with "user" being the username and "PBS1.com" being the domain name of PBS1. The online identity may or may not be a valid e-mail address for the user of the online identity. The user may therefore register an online identity that is used in other contexts (e.g., e-mail) or used with respect to at least one of several interoperating presence-based services, such that the user can leverage the open name space without seeking any additional online identities or abandoning the use of any existing online identities. That is, the user may register the online identity with one domain, and use that identity to access other domains. For instance, a user can use an existing e-mail address (which may also be registered as the online identity for an instant messaging (IM) service operated in the same administrative domain as the e-mail) as an online identity with respect to one or more other instant messaging services with which the user has not otherwise registered. The online identity simply reflects the e-mail address, including the user domain/source/origin through which the e-mail address was initially registered. In other words, a user may register an online identity with a first administrative domain that uses the identity as an e-mail address and as an identifier for presence-based services offered by the domain. The user then may use the online identity to access presence-based services operated by other, administrative domains, without specifically registering the online identity with those other administrative domains. For example, the user may have registered user@yahoo.com for e-mail and instant messaging operated by Yahoo!®. The user then may use the online identity user@yahoo.com to access the IM service operated by AOL® (referred to as AIM®).

Referring again to FIG. 1, an open name space network 100 includes a client system 110, PBS1 120, PBS2 130, and a network 139. The client system 110 includes client software 112 configured for presence-based service of PBS1 120 or PBS2 130. The operator of client system 110 uses the client software 112 to communicate with PBS1 120 or PBS2 130 via the network 139. PBS1 120 includes a login server 122 and a presence-based service 124. Similarly, PBS2 130 includes a login server 132 and a presence-based service 134. Login server 122 or 132 authorizes access by client system 110 to the presence-based systems 120 and 130. Presence-based service 124 and/or 134 allows the client system 110 to communicate with other client systems connected to one or more interoperable presence-based services 124 or 134 via the network 139.

For example, PBS1 120 and PBS2 130, respectively, may represent AOL® and EarthLink® internet service providers, and presence-based services 124 and 134 for PBS1 120 and PBS2 130 may represent AOL® IM and EarthLink® IM infrastructures, respectively. In this situation, as will be described in greater detail below, an online identity identified as user@EarthLink.com is able to send and receive instant messages and share presence information with users of the AOL® IM service and the EarthLink® IM service, regardless of whether user@EarthLink.com is logged into clients of either or both of those services.

Figure 2A:
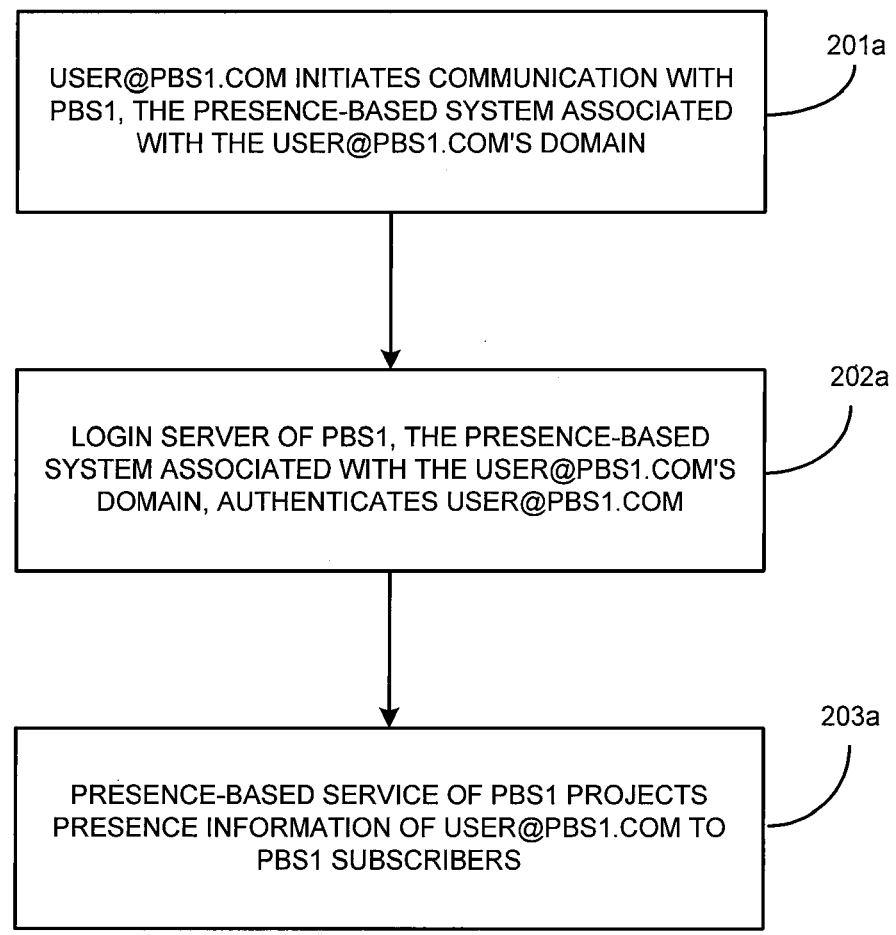
FIGS. 2A-2B illustrate processes for allowing access to PBS1 with an online identity that is associated with the domain of PBS1.
Figure 2B:
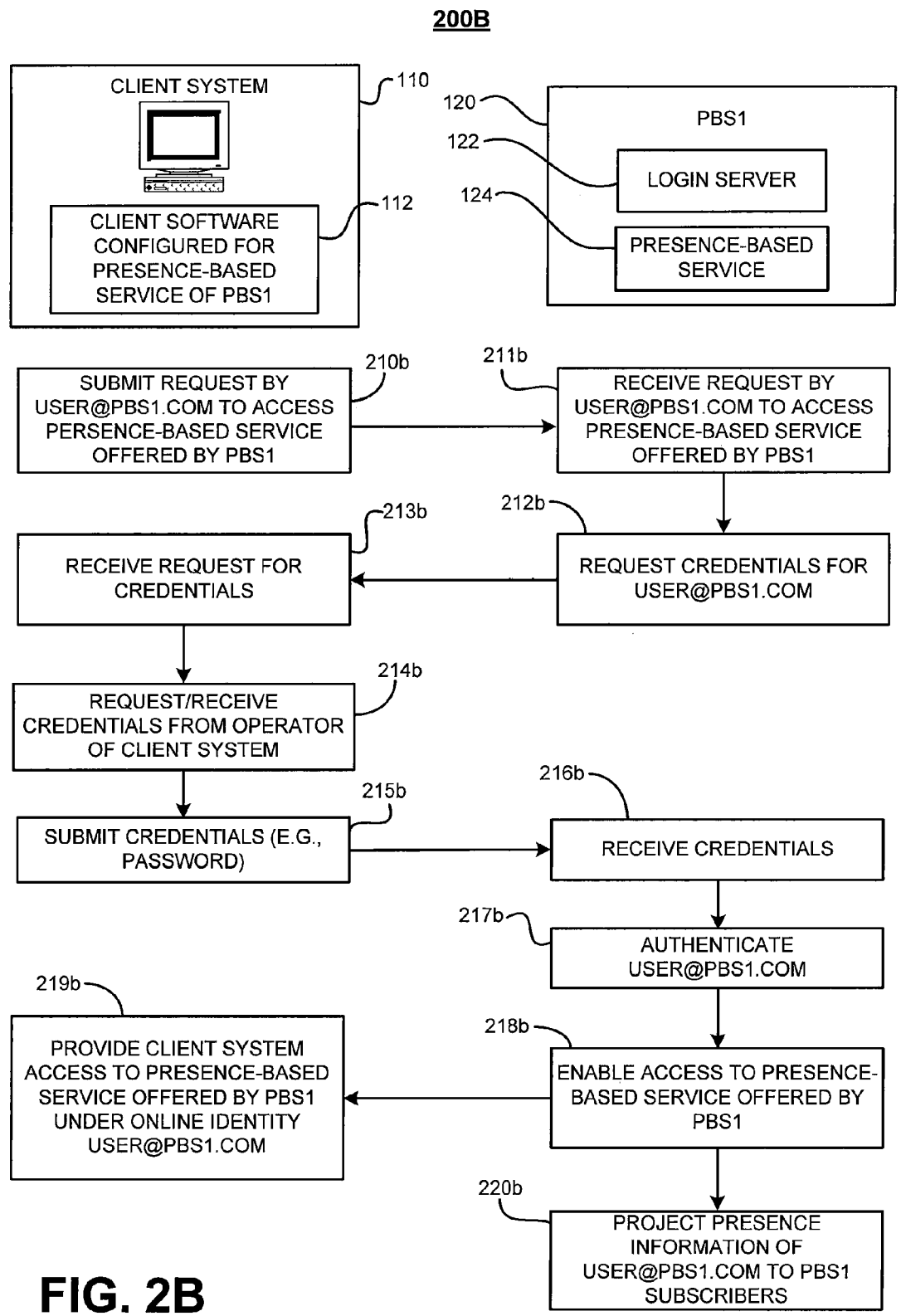

FIGS. 2A-2B illustrate processes 200A and 200B, respectively for allowing an online identity to access a presence-based system, e.g., PBS1 120, associated with a domain of the online identity (e.g., user@PBS1.com logs into PBS1). In particular, FIG. 2A illustrates a general process 200A for allowing a client system to access a presence-based system, e.g., PBS1, using an online identity associated with the domain of PBS1. Process 200A begins with the client system 110 initiating communication with PBS1 120 using an online identity, user@PBS1.com (201a). To do so, the client system 110 may use the client software 112 configured for the presence-based service 124 of PBS1 120. In particular, the client system 110 may use the client software 112 to submit the online identity and credentials associated therewith to PBS1 120. PBS1 120 is associated with the domain of the online identity because the online identity was initially registered with that presence-based system, and hence reflecting the domain name after the "@" symbol.

In response to the initiated communications, the login server 112 of PBS1 120 authenticates the client system (202a) and communicates the authentication to the presence-based service 124. The presence-based service 124 projects changes in presence of user@PBS1.com to PBS1 120 users that subscribe to presence information for user@PBS1.com (203a). This may include informing such subscribers that user@PBS1.com has logged into presence-based service 124 and is available to chat.

Referring to FIG. 2B, process 200B is similar in some respects to the process 200A of FIG. 2A, but provides a more detailed example of authenticating and authorizing the client system 110 to access PBS1 using the online identity, user@PBS1.com. Process 200B begins with the client system 110 submitting a request to access presence-based service 124 offered by PBS1 120 (210b). The client system 110 may use the client software 112 configured for PBS1 to submit the request, which may include the online identity user@PBS1.com. PBS1 120 receives the request (211b), and, in response, PBS1 120 requests credentials for user@PBS1.com (212b). In a slightly modified scenario, the client system 110 provides PBS1 120 with the credentials as part of the original request; thus, eliminating the need for PBS1 120 to solicit the client system 110 for credentials.

The client system 110 receives the request for the credentials (213b) and requests the credentials from the operator of the client system 110 (214b). In response, the operator of the client system 110 provides the credentials (e.g., password), which are submitted to PBS1 120 (215b). PBS1 120 receives the credentials (216b) and authenticates user@PBS1.com (217). To authenticate user@PBS1.com, the login server 122 matches the online identity and password to the information stored in a credentials database. If such match exists, then the login server 122 enables the client system 110 to access the presence-based service 124 offered by PBS1 120 (218b and 219b). The presence-based service 124 projects the online presence of the online identity to users of PBS1 120 that have subscribed to such information (220b) (e.g., list the online identity among their instant message contact list) or who make a specific request for knowledge that user@PBS1.com has logged into the presence-based service 124 offered by PBS1 120 and is available to chat.

Figure 3A:
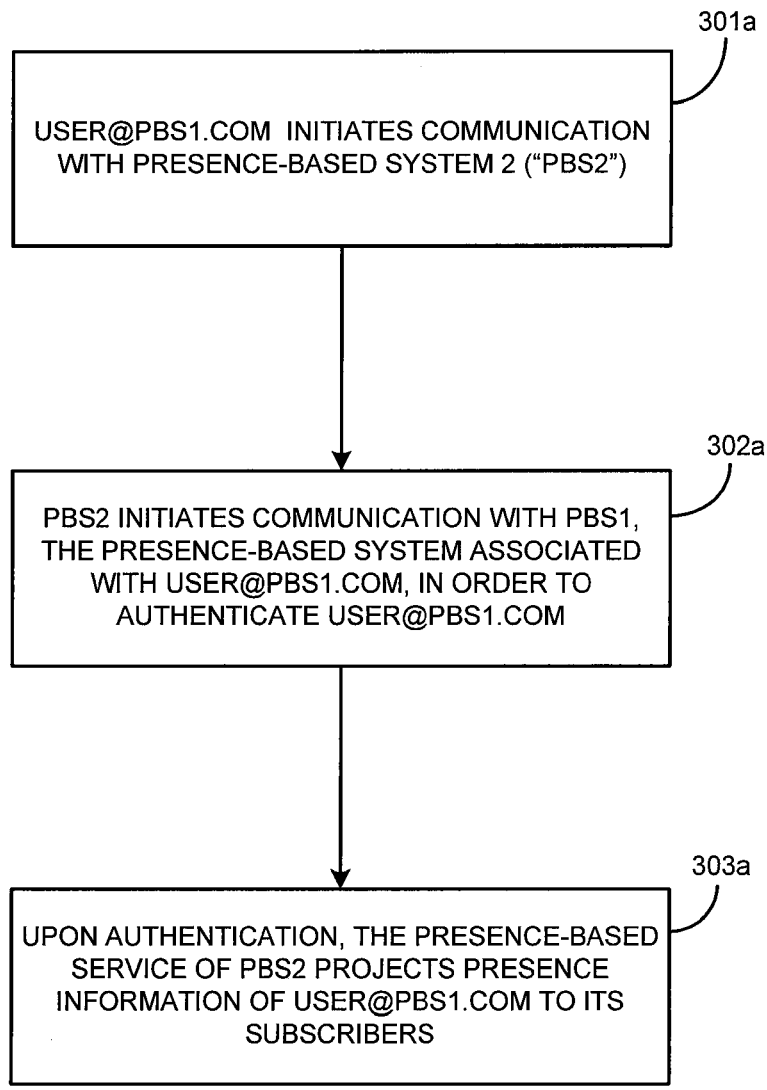
FIG. 3A illustrates a process for allowing access to PBS2 with an online identity that is not associated with the domain of PBS2.

FIG. 3A illustrates a process 300A for allowing a client system 110 to access a presence-based system, e.g., PBS2 130, using an online identity that is not associated with the domain of PBS2 130 (e.g., user@PBS1.com logs into PBS2 130). Process 300A begins with the client system 110 initiating communication with PBS2 130, which has interoperability with PBS1 120 (301a). To do so, the client system 110 may use the client software 112 configured for PBS2 130. In particular, as part of initiating communications with PBS2 130, the client software 112 may provide the online identity, e.g., user@PBS1.com, and associated password to a login server 132 of PBS2 130. PBS2 130 recognizes that the online identity is associated with PBS1 120 due to the domain name in the online identity. In one implementation, PBS2 130 consults a table that includes association between the domain names and the presence-based service associated therewith to identify the presence-based service (e.g., PBS1 120) that is associated with user@PBS1.com. In another implementation, PBS2 130 may provide the domain name to a domain name server to identity the presence-based service associated with user@PBS1.com. In response, the domain name server identifies PBS1 120, resolves an IP address associated with PBS1 120, and provides this information to PBS2 130 to enable PBS2 130 to communicate with PBS1 120.

PBS2 130 then initiates communication with PBS1 120, the presence-based system associated with the domain of user@PBS1.com, in order to authenticate user@PBS1.com (302a). Upon authentication, PBS2 130 enables access by the client system 110 to the presence-based service 134 of PBS2 130. The presence-based service 134 projects the online presence of user@PBS1.com to users of PBS2 130 (303a). As suggested with respect to FIGS. 2A-2B, the online presence is projected to users of PBS2 130 that subscribe to such information (e.g., list the online identity among their instant message contact list) or who make a specific request for knowledge of user@PBS1.com's presence. Presence may also be reflected for aliases associated with the online identity, user@PBS1.com, which aliases may be accessed at either of PBS1 120 or PBS2 130.

Figure 3B:
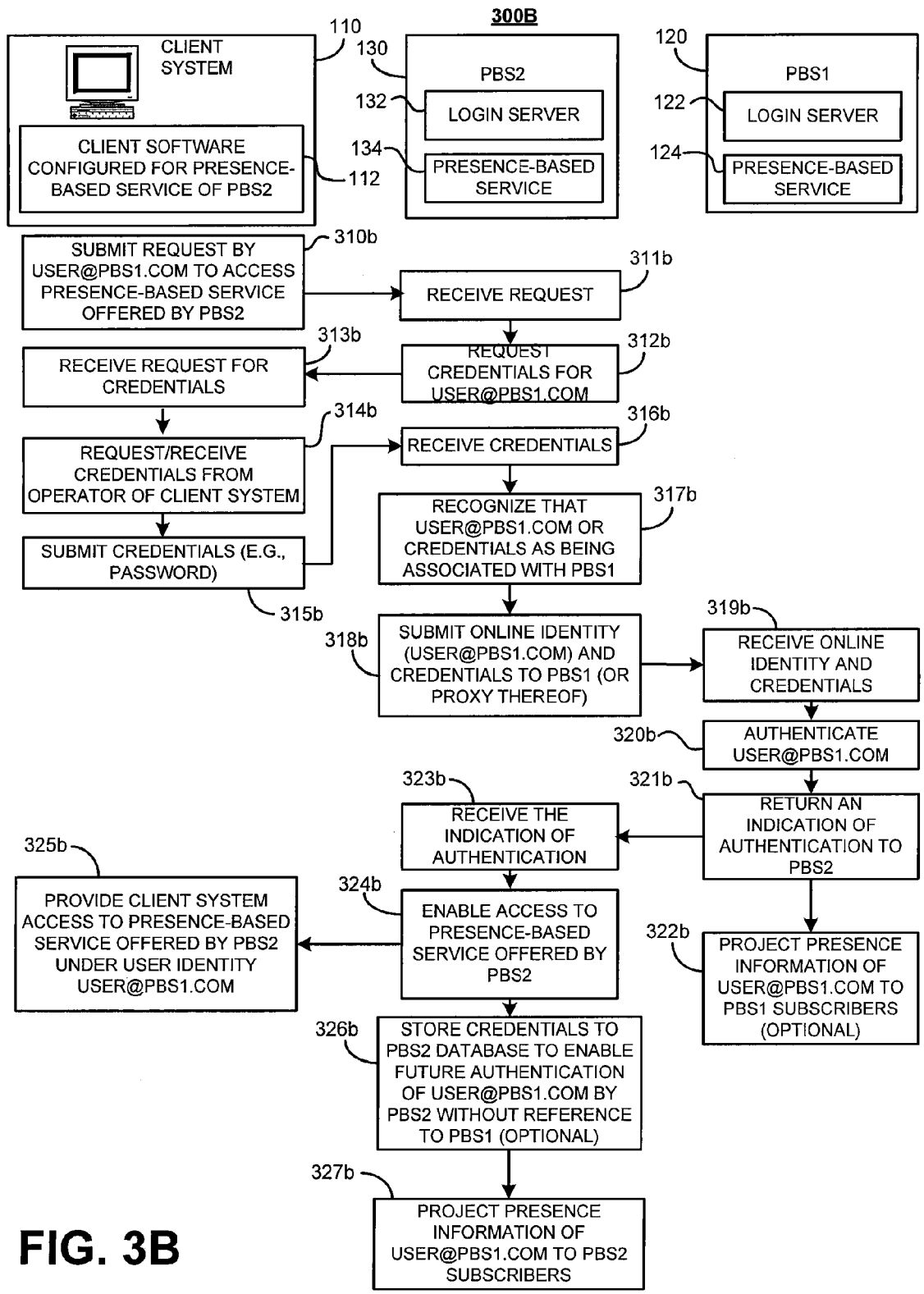
FIGS. 3B-3E illustrate various methods used by PBS2 to authenticate an online identity.
Figure 3C:
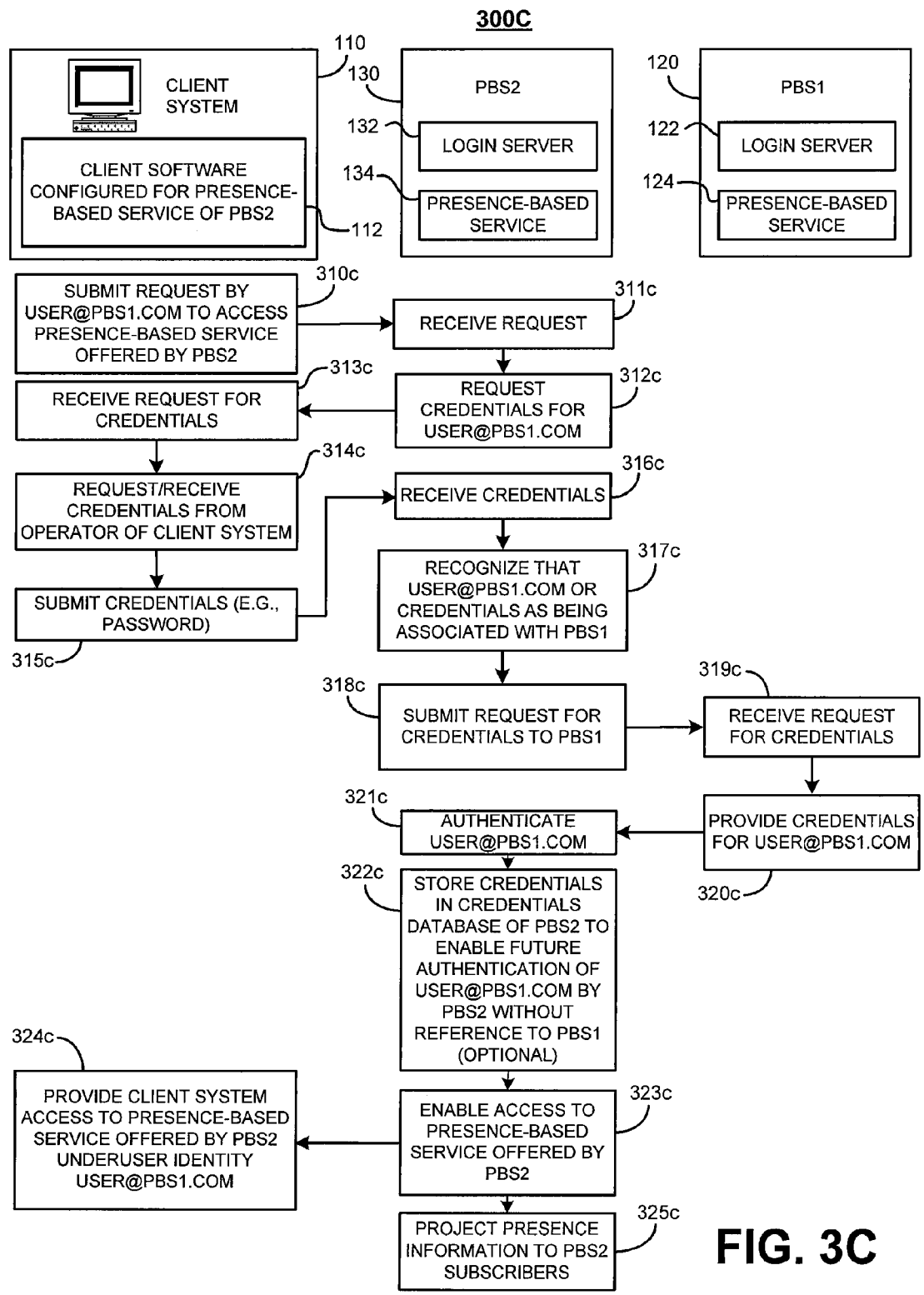

FIGS. 3B and 3C, illustrate various processes used by PBS2 130 to authenticate an online identity, user@PBS1.com, as generally illustrated by the operation block (302a) in FIG. 3A. In particular, in FIG. 3B, PBS2 130 delegates the authentication of the online identity to PBS1 120. In contrast, in FIG. 3C, PBS2 130 request authentication information from PBS1 120 and PBS2 130 performs the authentication.

Processes 300B and 300C of FIGS. 3B and 3C, while similar in some respects to process 300A of FIG. 3A, each provide a more detailed example of authenticating and authorizing the client system 110 to access PBS2 130 using the online identity, user@PBS1.com. FIG. 3B illustrates a process 300B that enables PBS2 130 to delegate authentication of user@PBS1.com to PBS1 120. Process 300B begins with the client system 110 submitting a request to access presence-based service 134 offered by PBS2 130. The client system 110 may use the client software 112 installed on the computer 110 and configured for presence-based service 134 to submit the request to access the presence-based service 134. The request may include the online identity, user@PBS1.com.

PBS2 130 receives the request (311b) and, in response, requests credentials associated with user@PBS1.com (312b). The client system 110 receives the request for credentials (313b) and requests the credentials from the operator of the client system 110 (314b). The operator of the client system 110 provides the credentials (e.g., password), which are submitted to PBS2 130 (315b). PBS2 130 receives the credentials (316b) and recognizes that user@PBS1.com and/or the credentials associated therewith is associated with PBS1 120. As noted above with respect to FIGS. 2A-2B, PBS2 130 may recognize that user@PBS1.com is associated with PBS1 120 by referencing the domain name included in user@PBS1.com. To this end, PBS2 130 references the domain name appearing after the @ symbol to recognize the domain associated with user@PBS1.com.

Upon recognizing that user@PBS1.com is associated with PBS1 120, PBS2 130 submits to PBS1 120 (or proxy thereof) the online identity and the received credentials, e.g., password, (318*b*). PBS1 120 receives the online identity and the credentials (319*b*), authenticates the online identity (320*b*), and returns an indication of authentication to PBS2 130 (321*b*). To authenticate user@PBS1.com, PBS1 120 may use the login server 122. The login server 122 attempts to match user@PBS1.com and the credentials to stored information in its credentials database. If a match exists, the login server 122 returns the indication of the authentication to PBS2 130.

PBS1 120 simply notifies PBS2 130 of whether or not user@PBS1.com has been successfully authenticated (321*b*). PBS2 130 receives this notification (323*b*) and based on this information, PBS2 130 provides or denies access to the client system 110 accordingly (324*b*-325*b*). If the client system 110 is provided access, PBS2 130 projects presence information for user@PBS1.com to PBS2 130 subscribers who have subscribed to such information (327*b*). Similarly, PBS1 may optionally project the presence information for user@PBS1.com to PBS1 120 subscribers who have subscribed to such information (322*b*).

In a slightly modified scenario, PBS2 130 may optionally store, within its credentials database, the credentials submitted with respect to user@PBS1.com and record an indication of whether or not such credentials were used to successfully authenticate user@PBS1.com (326*b*). Thereafter, subsequent requests made on behalf of user@PBS1.com are handled without requiring input from PBS1 120. In another variation of this scenario, PBS2 130 obtains certain information from the operator of the client system 110 who is using an online identity corresponding to a different domain (e.g., user@PBS1.com). Specifically, for example, PBS2 130 requests completion of a registration form 500 of FIG. 5, in response to which PBS2 130 receives information such as date of birth, gender, country of origin, zip code, and alternate e-mail address. The registration form 500 also may elicit a credit card number for verifying the received information. After verification, PBS2 130 stores the online identity's credentials into its credentials database, conditioned (under one scenario) upon a determination that the operator of the client system 110 meets a minimum age requirement, as shown in FIG. 7.

Figure 7:
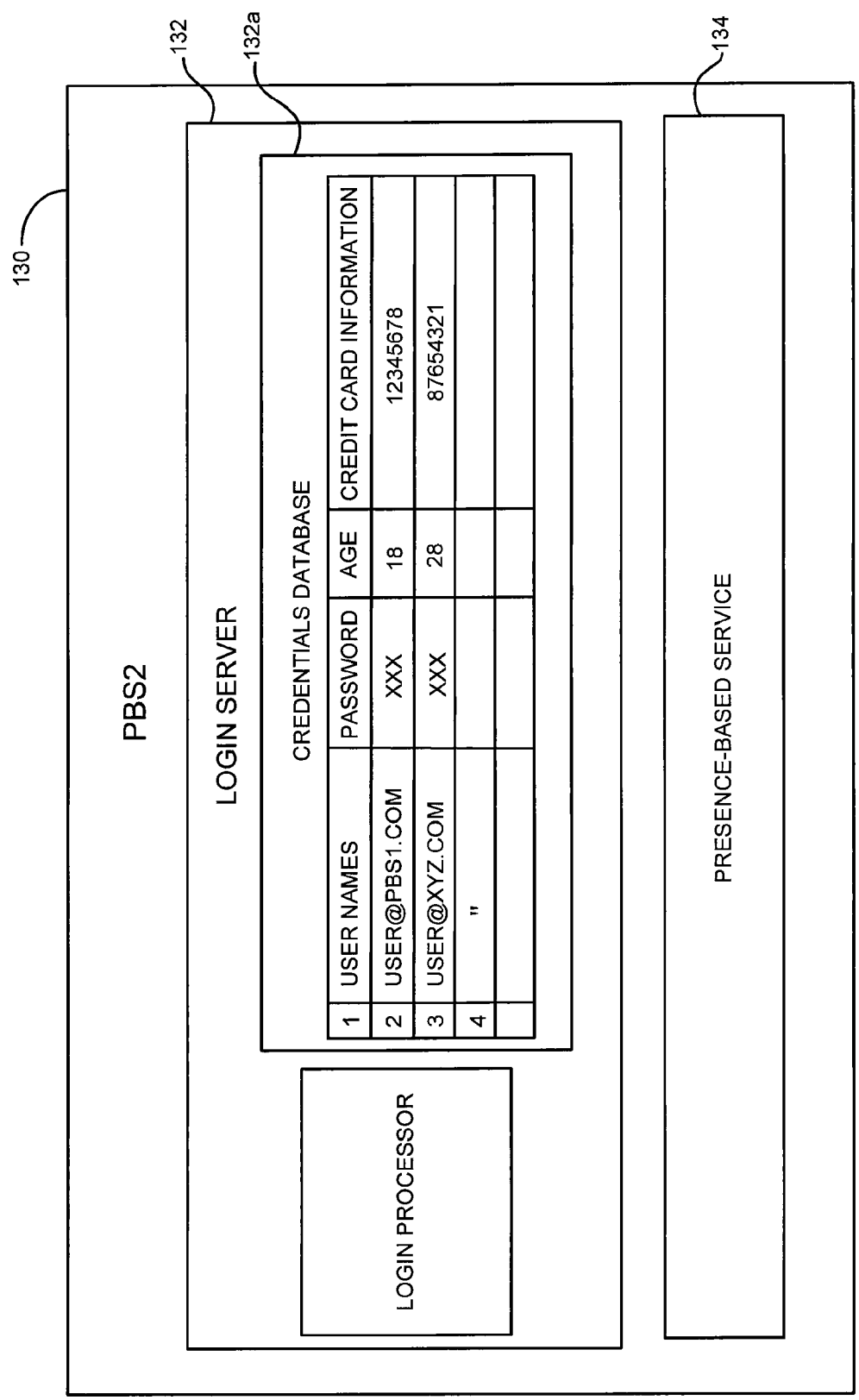
FIG. 7 illustrates, in more detail, the credentials database of FIG. 3D that stores credentials of an online identity.

Referring to FIG. 7, the login server 132 of PBS2 130 includes a login process 132*a* and a credentials database 132*b*. The credentials database 132*b* stores credentials, e.g., e-mail address, password, age, and credit card information. Using these variations, subsequent attempts to use the online identity user@PBS1.com to log into PBS2 130 can be handled using a simplified authentication process that more closely resembles that shown by FIGS. 2A-2B.

Diverging from each of the above scenarios, PBS2 130 may be configured to itself perform the authentication of the online identity associated with other domains such as user@PBS1.com. That is, PBS2 130 does not have to delegate to PBS1 120 the authentication process. Instead, referring to FIG. 3C, PBS2 130 may use a process 300C to request the credentials information from PBS1 120, and PBS2 130 may use the credential information to perform the authentication process.

Process 300C begins with actions (310*c*-317*c*) which are the same as actions (310*b*-317*b*), and, as such, are previously described with respect to actions (310*b*-317*b*). Process 300C differs from process 300B because it includes PBS2 130 requesting credentials from PBS1 120 (318*c*) and authenticating user@PBS1.com mailto:user@PBS1.combased on the received credentials (321*c*). In particular, PBS2 130 submits a request for credentials associated with the online identity to PBS1 120 (318*c*). PBS1 120 receives the request for credentials (319*c*) and provides PBS2 130 with the credentials associated with the online identity (320*c*). PBS2 130 receives the credentials and compares it to the credentials received from the client system 110 to determine whether a match exists. If so, PBS2 130 authenticates the online identity (321*c*).

Figure 3D:
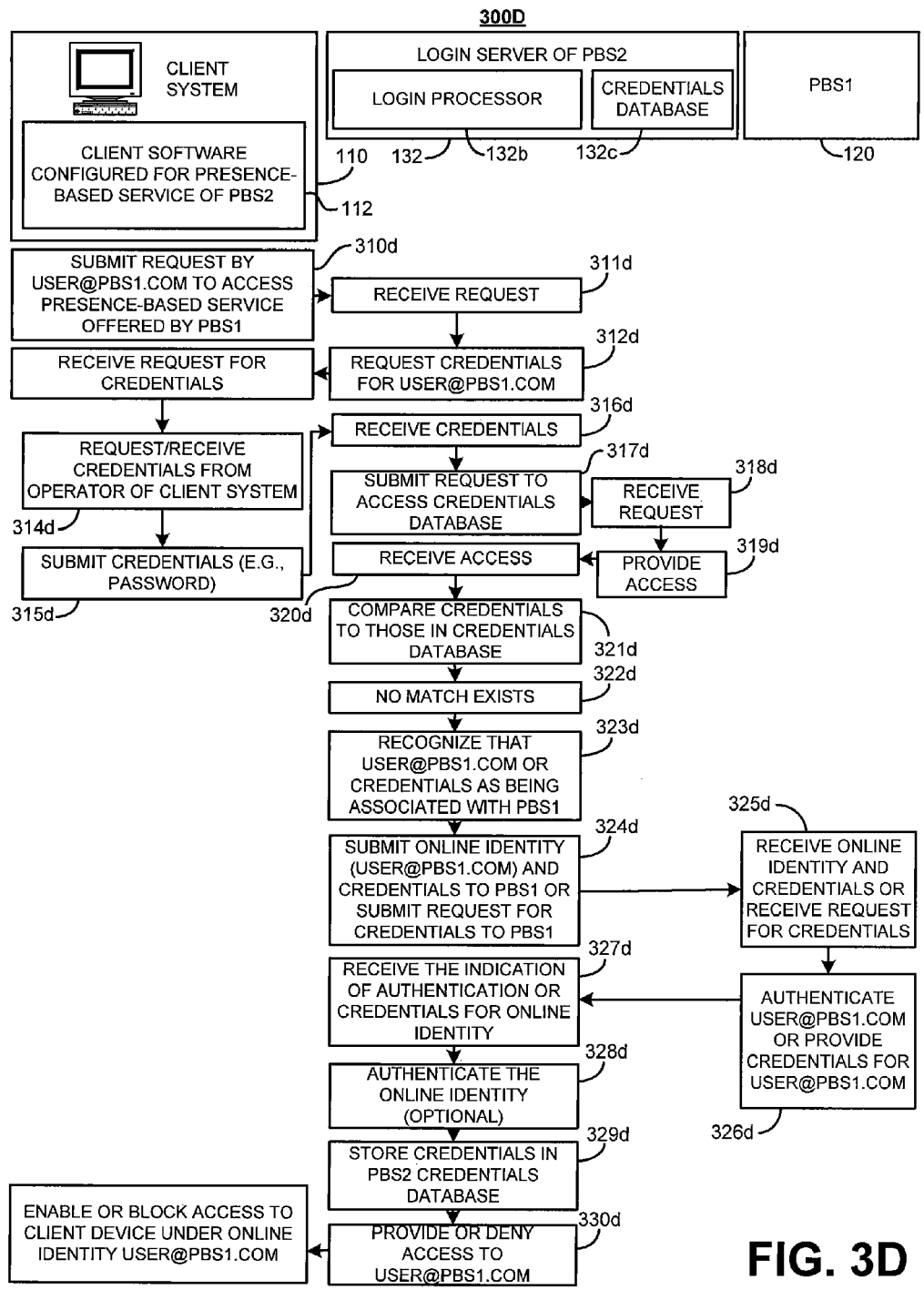

Notably, the variations described above with respect to process 300B of FIG. 3B also apply to process 300C of FIG. 3C scenario, particularly since each involves PBS2 130 performing an authentication step. Specifically referring to FIG. 3D, a process 300D may be used to identify whether PBS2 130 previously stored the credentials information at the conclusion of the previous processes 300B and 300C, and, if so, to authenticate the online identity internally. Process 300D begins with the client system 110 submitting a request to access presence-based service 132 offered by PBS2 130 (310*d*). As noted above, the client system 110 may use the client software 112 configured for PBS2 130 to access the presence-based service 134. The request may include the online identity, user@PBS1.com.

The login processor 132*a* receives the request (311*d*) and, in response, requests credentials for user@PBS1.com (312*d*). The client system 110 receives the request for credentials (313*d*) and requests the credentials from the operator (314*d*). The operator of the client system 110 provides the credentials, which are submitted to the login processor 132*a* (315*d*). The login processor 132*a* receives the credentials (316*d*) and submits a request to access credentials database 132*b* (317*d*). The credentials database 132*b* receives the request (318*d*) and provides access to the login processor 132*a* (319*d*). The login processor 132*a* receives access (320*d*) and compares the received credentials to those in the credentials database in order to verify the received credentials (321*d*). The login processor 132*a* attempts to identify a match for the online identity and determine whether the online identity can log into PBS2 130 without relying on PBS1 120. If PBS2 130 had stored the information at the conclusion of the previous processes 300B or 300C, as optionally illustrated by FIGS. 3B and 3C, then the login processor 132*a* authenticates the online identity using the information in the credentials database 132*b*. Otherwise, the login process 132*a* relies on PBS1 120 for authentication in the manner as illustrated in FIGS. 3B and 3C.

Specifically, if the login processor 132*a* determines that no match exists (322*d*), then the login processor 132*a* relies on PBS1 120 in order to verify the received credentials. In particular, the login processor 132*a* recognizes that user@PBS1.com is associated with PBS1 120 (323*d*) and submits user@PBS1.com and the received credentials to PBS1 120 to enable PBS1 120 to authenticate user@PBS1.com and return a notification of authentication (324*d*-327*d*), similar to actions (318*b*-323*b*) described with respect to process 300B of FIG. 3B. Alternatively, the login processor 132*a* may submit a request to obtain credentials information from PBS1 120 and perform the authentication itself (324-327*d*), similar to actions (318*c*-321*c*) described with respect to process 300C of FIG. 3C.

In another implementation, when an operator of the client system 110 attempts to access PBS2 130 using an online identity, user@PBS1.com, PBS2 130 recognizes that the online identity is associated with another presence-based system (e.g., PBS1 120) and instructs or redirects the client software 112 to authenticate with PBS1 120 first. In particular, PBS2 130 redirects the client software 112 to PBS1 120 for authentication. PBS1 120 then authenticates user@PBS1.com and generates an authentication ticket, which PBS1 120 then sends to the client software 112. The authentication ticket may be used by the client software 112 to access PBS2 130. As such, the client software 112 presents the authentication ticket to PBS2 130 to gain access to PBS2 130. Upon receiving the authentication ticket, PBS2 130 validates the authentication ticket with PBS1 120. If the authentication ticket is validated, PBS2 130 enables the client system 110 to access PBS2 presence-based service 134.

Figure 3E:
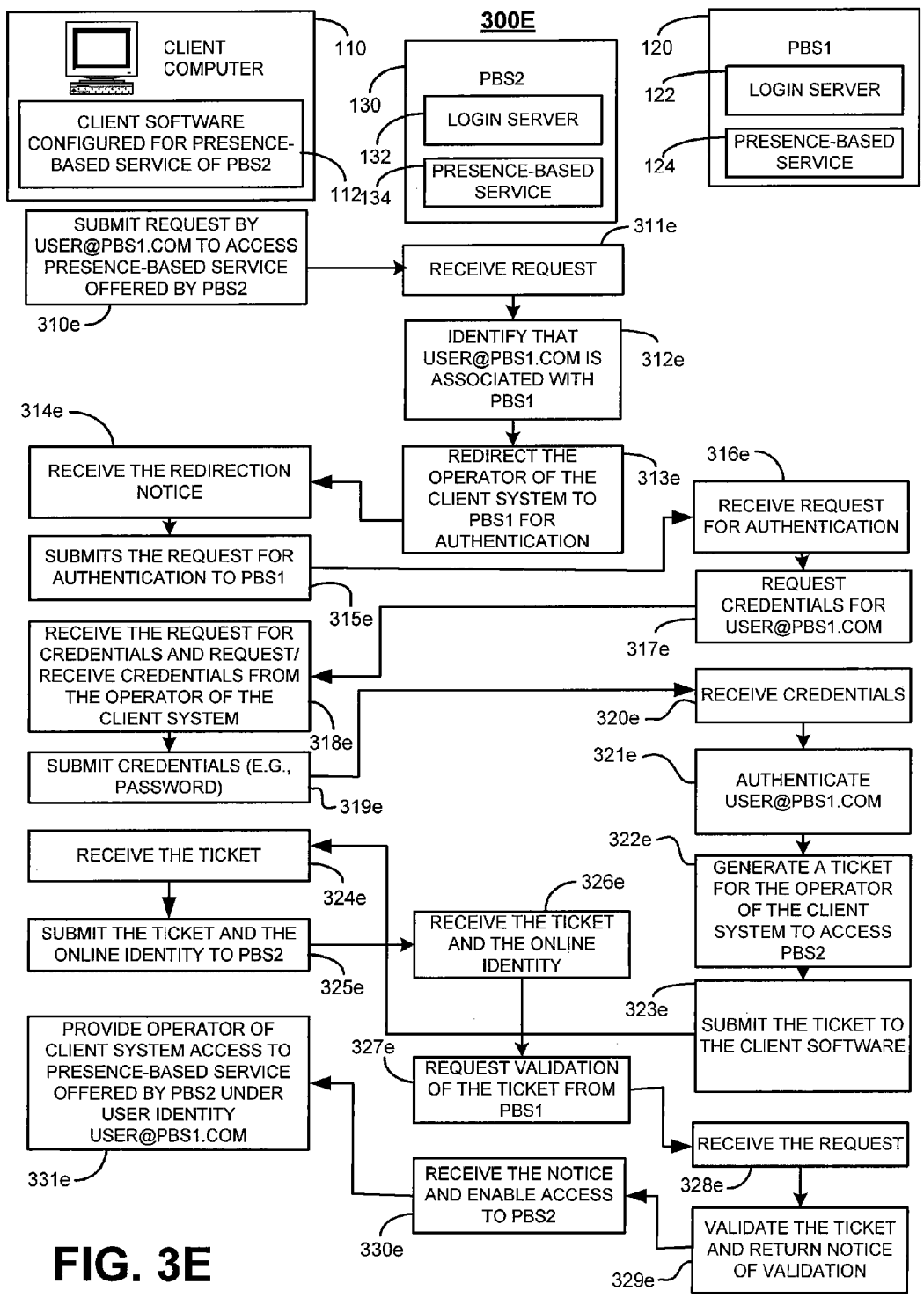

FIG. 3E illustrates an example of a process 300E that may be used to implant the above described techniques. Process 300E begins with the client system 110 submitting a request to access presence-based service 134 offered by PBS2 130 (310e). The client system 110 may use the client software 112 configured for PBS2 130 to submit the request. In one example, the client software 112 may provide an interface on the client system 110 for enabling the operator to provide the online identity (and possibly credentials) to be submitted with the request.

PBS2 130 receives the request (311e) and identifies that user@PBS1.com is associated with PBS1 120 (312e). To identify the domain with which user@PBS1.com is associated with, in one implementation, PBS2 130 references the domain name appearing after "@" symbol, which identifies the domain with which the online identity is registered. In a slightly different scenario, PBS2 130 requests that the computer operator identify which domain the online identity is registered. For example, PBS2 130 may instruct the client software 112 to include a field (e.g., a domain name field) that solicits the computer operator for such information.

In either case, upon identifying that user@PBS1.com is associated with PBS1 120, PBS2 130 redirects the client software 112 to PBS1 120 for authentication (313e). The client software 112 receives the redirection notice (314e) and submits the request for authentication to PBS1 120 (315e). In one implementation, to submit the request for authentication to PBS1 120, the client software 112 may be modified to include, within its user interface, specific authentication fields associated with PBS1 120. In one example, the specific field may include a user name field and a password field, each of which carrying the PBS1 120 identifier, to inform the computer operator they are associated with PBS1 120. In another implementation, the client software 112 may launch another user interface (e.g., a web page) associated with PBS1 120 and prompt the computer operator to complete the fields within the user interface. The computer operator may enter the online identity within one of the fields and submit it to PBS1 120.

PBS1 120 receives the request for authentication (316e) and requests credentials for user@PBS1.com (317e). The client system 110 receives the requests for credentials and requests credentials from the computer operator (318e). The computer operator provides the credentials (e.g., password), which are submitted to PBS1 120 (319e). In a slightly modified scenario, the computer operator may submit the credentials along with the online identity thereby relieving PBS1 120 from having to request it.

PBS1 120 receives the credentials (320e) and authenticates user@PBS1.com by comparing the received online identity and password with the stored credentials within the credentials database (321e). Upon authenticating user@PBS1.com, PBS1 120 generates an authentication ticket to enable the client system 110 to access PBS2 130 (322e) using the online identity user@PBS1.com. PBS 120 returns the authentication ticket to the client software 112 (323e). The client software 112 receives the authentication ticket (324e) and submits the ticket with the online identity to PBS2 130 (325e).

PBS2 130 receives the ticket (326e) and requests, from PBS1 120, validation of the ticket (327e). PBS1 120 receives the request (328e), validates the ticket and returns a notice of validation to PBS2 130 (329e). PBS2 130 receives the notice of validation and allows the client system 110 to access PBS2 130 using the online identity user@PBS1.com (330e and 331e).

In a slightly modified scenario, the client software 112 may be configured to automatically send the authentication request to PBS1 120 when the computer operator uses user@PBS1.com as an online identity to access PBS2 presence-based service 134. In this manner, process 300E may be modified such that instead of submitting the request to PBS2 130, the client software 112 recognizes the online identity is associated with PBS1 120 and instead the client software 112 sends the authentication request to PBS1 120. The modified process would continue with the remaining actions (318e-331e). In another implementation, after identifying that the online identity is associated with PBS1 120 and directing the client software 112 to PBS1 120, PBS2 130 may instruct the client software 112 to automatically send future authentication requests to PBS1 120. For example, the client software 112 may be able to use different login modules, each one for a different system, and PBS2 130 may instruct the client software 112 to use the module for PBS1 120.

Figure 4A:
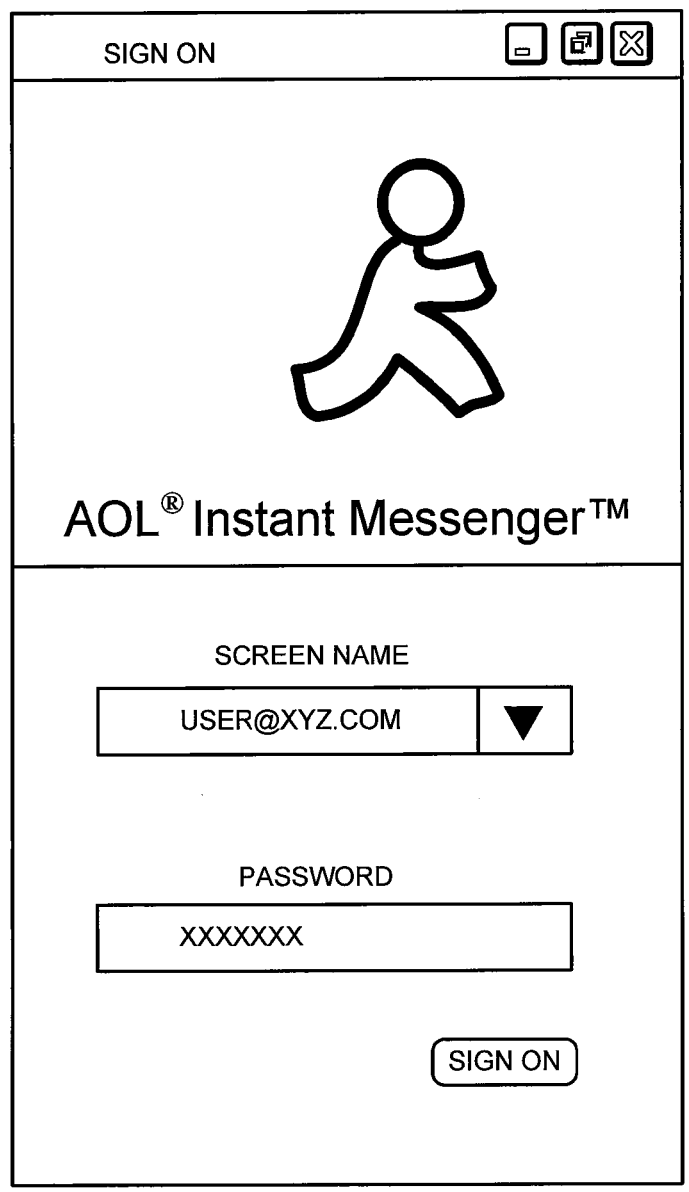
FIG. 4A illustrates a graphical user interface used to enable input of an online identity and credentials.
Figure 4B:
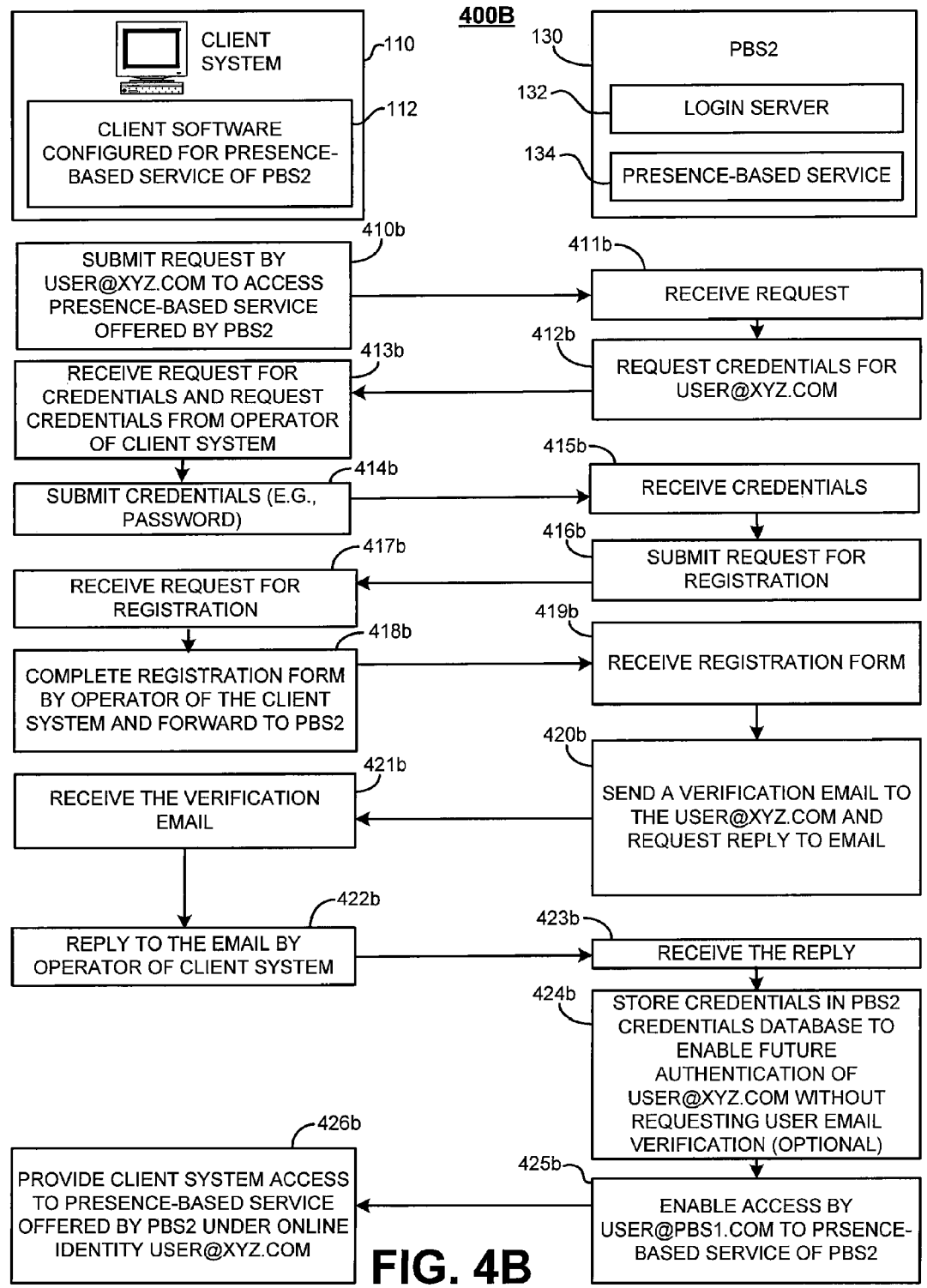
FIG. 4B illustrates a process for allowing an online identity, which is entered using the graphical user interface of FIG. 4A and which includes an obscure domain, to access PBS2, which does not have interoperability with presence-based system associated with the obscure domain.

FIG. 4A illustrates a graphical user interface 400A used to enable input of an online identity and credentials therefor. Specifically, in FIG. 4A, an e-mail address is used as the online identity. In this case, a computer operator attempts to log into PBS2 130 using the online identity user@xyz.com, which is associated with a domain (xyz.com) that is not associated with PBS2 130 or any of the presence-based systems with which PBS2 130 has established interoperability. In response to such an attempt, and as illustrated by process 400B shown in FIG. 4B, PBS2 130 elicits completion by the computer operator of a registration form, such as the one shown in FIG. 5. Process 400B begins with client system 110 submitting a request to access presence-based service 134 offered by PBS2 130 using the online identity user@xyz.com (410b). PBS2 130 receives the request (411b) and, in response, requests credentials for user@xyz.com (412b). The client system 110 receives the request for credentials and requests the credentials from the operator of the client system 110 (413b). The operator of the client system 110 provides the credentials which are submitted to PBS2 130 (414b). PBS2 receives the credentials (415b) and submits a request for registration to the client system 110 (416b). As part of submitting the request for registration, PBS2 130 may submit the registration form 500 of FIG. 5 to the client system 110 for completion by the operator.

The client system 110 receives the request for registration (417b) and the operator completes the registration form, which is forwarded to PBS2 130 (418b). PBS2 130 receives the completed registration form (419b) and sends a verification e-mail to the online identity of the computer user and requests a reply to the e-mail (420b). The operator of the client system 110 receives the verification e-mail (421b) and replies to the e-mail (422b). Once PBS2 130 receives a reply e-mail (420b), PBS2 130 allows the client system 110 to access the presence-based service 134 (425b and 426b). That is, PBS2 130 conditions access by the client system 110 upon receipt of a reply to the verification e-mail sent to the e-mail address entered by the computer operator as an online identity, as such a reply suggests valid operation by the computer operator of an account with the unassociated domain under the identified e-mail address. Similar to previous implementations, PBS2 130 may store information received during authentication concerning credentials of the online identity, user@xyz.com, and their validity, so that it does not have to seek assistance from other systems or user e-mail verification the next time access is sought by user@xyz.com to PBS2 130 (424*b*).

Figure 6:
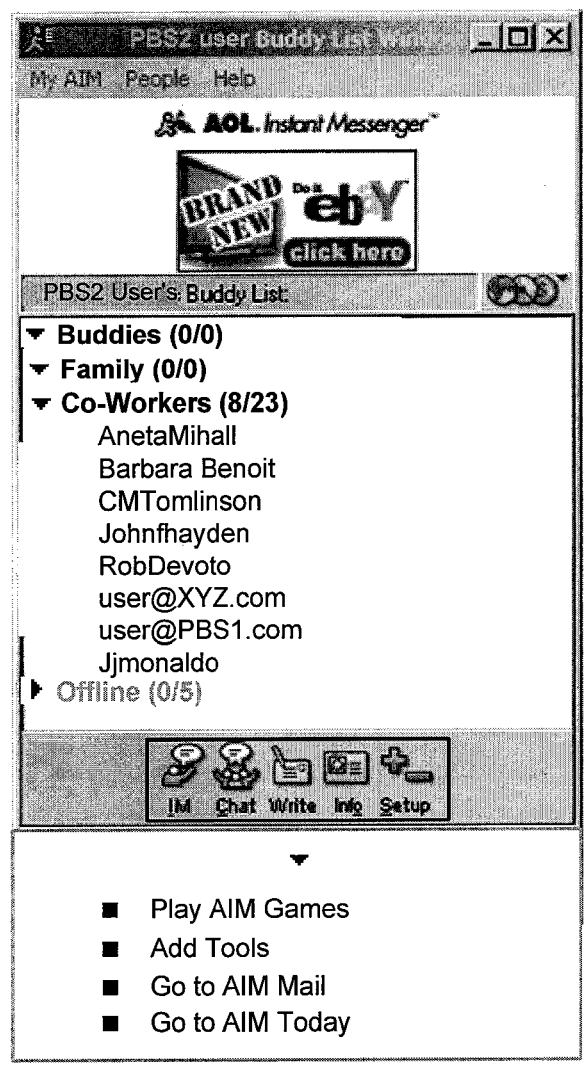
FIG. 6 illustrates online presence of online identities at a presence-based service of PBS2.

At the conclusion of processes such as those illustrated by FIGS. 2A-2B, 3A-3E, and/or 4B, or those leveraging the graphical user interfaces of FIGS. 4A and 5, online presence of the online identity, user@PBS1.com and/or user@xyz.com, may be reflected at the presence-based service into which a computer operator using the online identity logged in. Referring to FIG. 6, an example of a user interface 600 illustrates online presence of the online identities, user@PBS1.com and user@xyz.com, at a presence-based service of PBS2 130 into which operators using various online identities have logged in. More specifically, it shows presence by, among others, user@PBS1.com and user@xyz.com on a contact list of a PBS2 130 subscriber. Thus, the PBS2 130 subscriber may send messages to user@xyz.com and/or user@PBS1.com or receive messages from them.

In addition to the interoperability illustrated with respect to FIGS. 2A-4B, which, among other things, enables authentication at a presence-based service based on information or processes at another presence-based service, presence information may be communicated from one such service to another to be made apparent to subscribers of the different services. In addition, communications similarly may be sent and received by subscribers of the different services, all irrespective of whether a computer user gains access to a presence-bases system using client software or hosted portals provided by the domain to which its online identity is associated or another different domain service. In this manner, PBS2 130 may be configured to communicate with other (e.g., foreign) interoperable presence-based services, e.g., PBS1 120, associated with the domain of the online identity (user@PBS1.com in this example) and to inform these services of presence by the online identity through the PBS2 presence-based service 134, or changes thereto, e.g., log in, log off, idle, and away. There are many ways for informing the foreign presence-based services of the change in presence, several of which are illustrated in FIGS. 8A-9C. First, as shown in each of FIGS. 8A-8C, PBS2 130, which has locally authenticated the online identity, user@PBS1.com, informs a foreign presence-based service (e.g., PBS1 120) of presence by user@PBS1.com. Second, as shown in FIGS. 9A-9C, the foreign presence-based service, e.g., PBS1 120, is informed of user@PBS1.com presence by virtue of having to authenticate the user@PBS1.com (an example of which was illustrated in FIG. 3B).

Figure 8A:
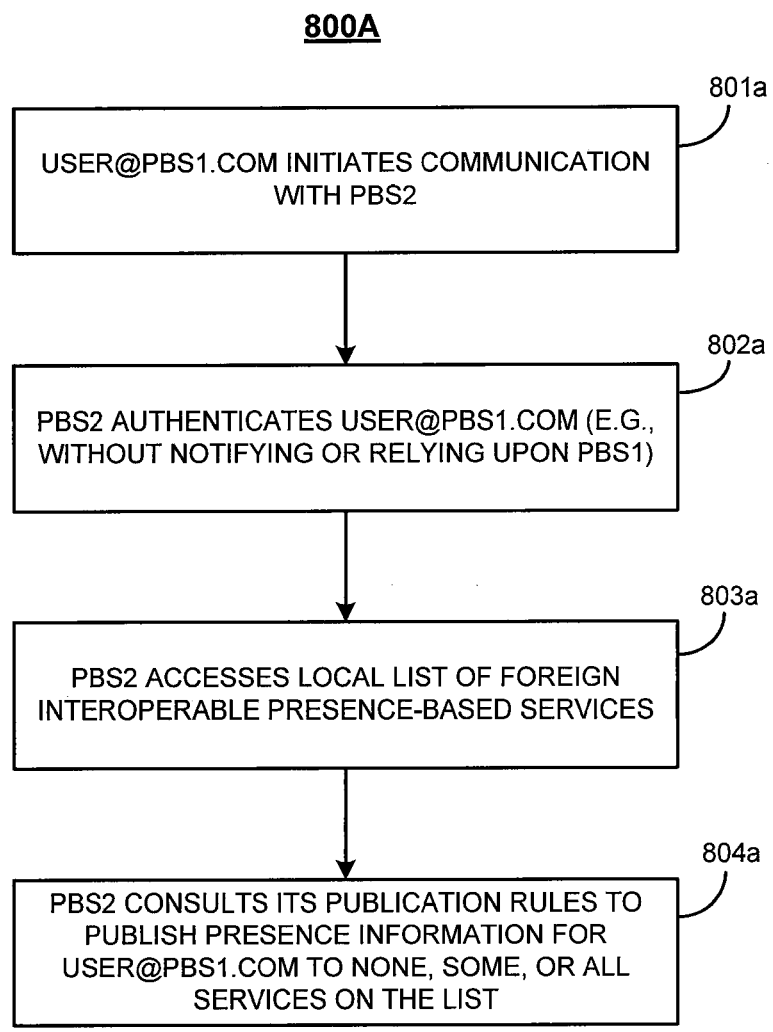
FIGS. 8A-9C illustrate various methods for informing foreign presence-based services of presence information for an online identity.
Figure 9A:
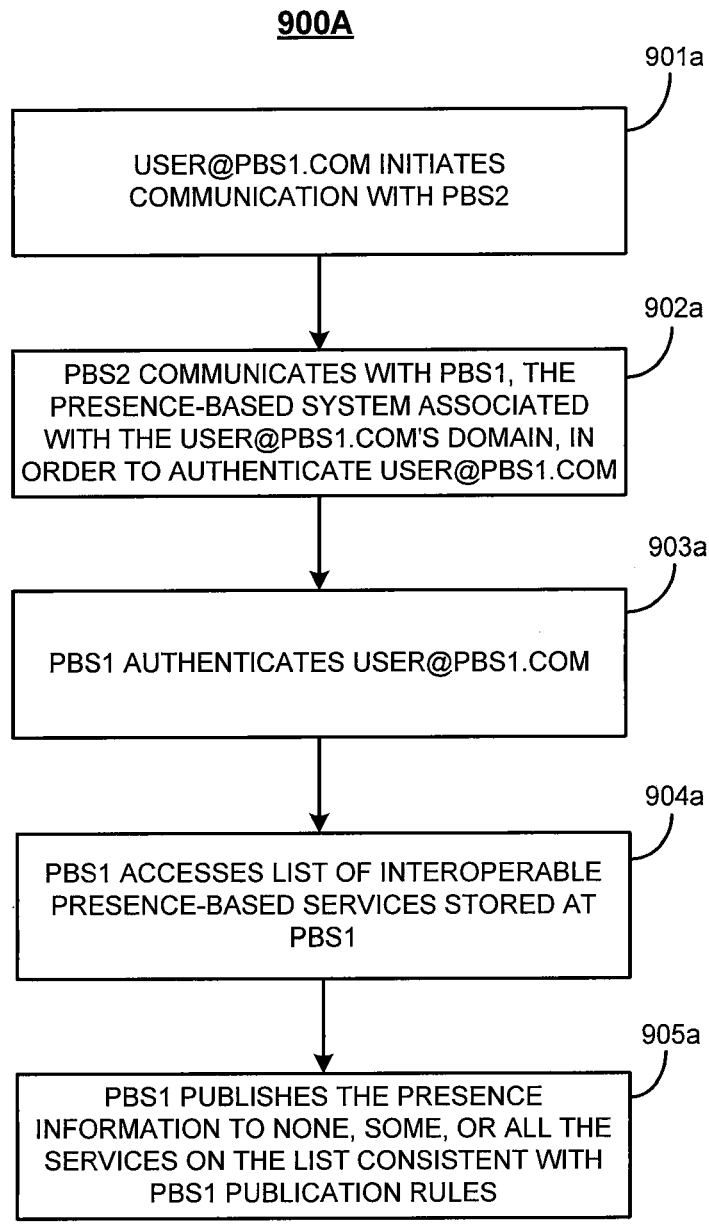
Figure 9B:
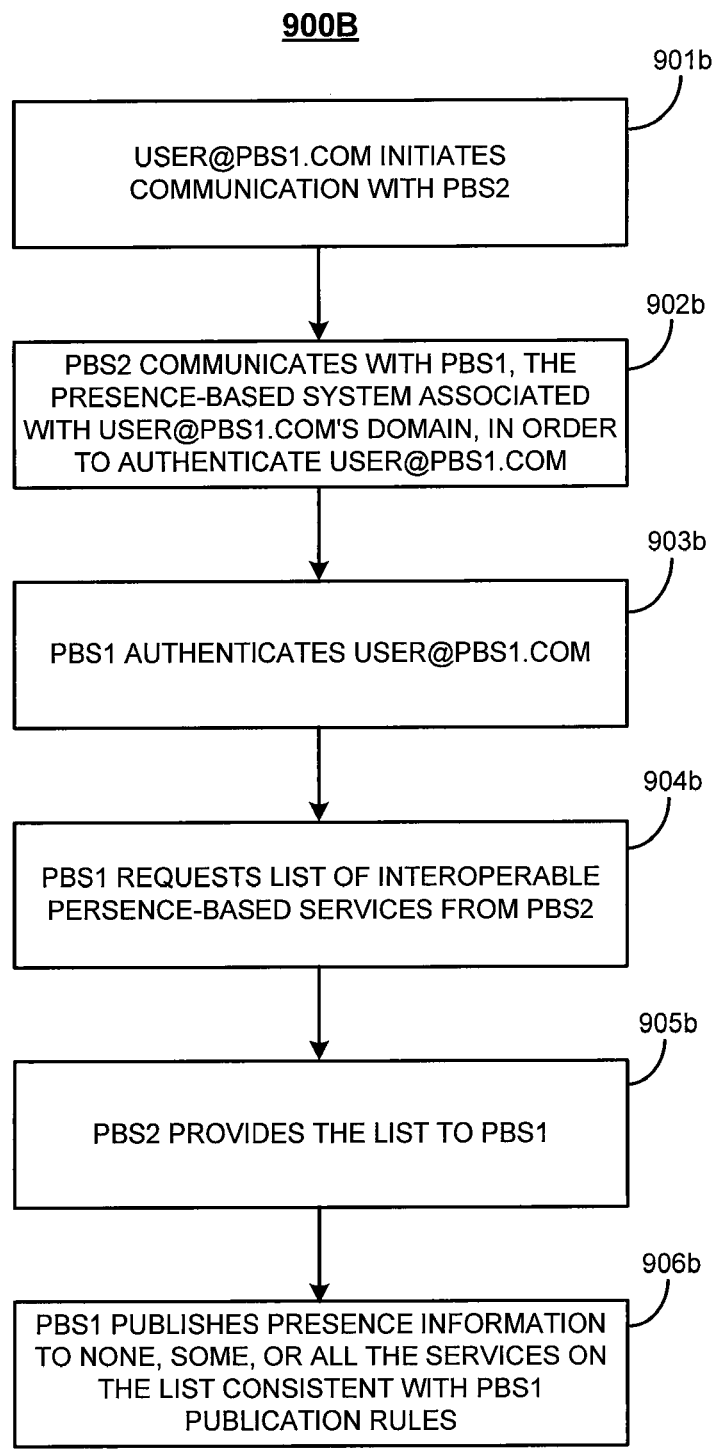
Figure 9C:
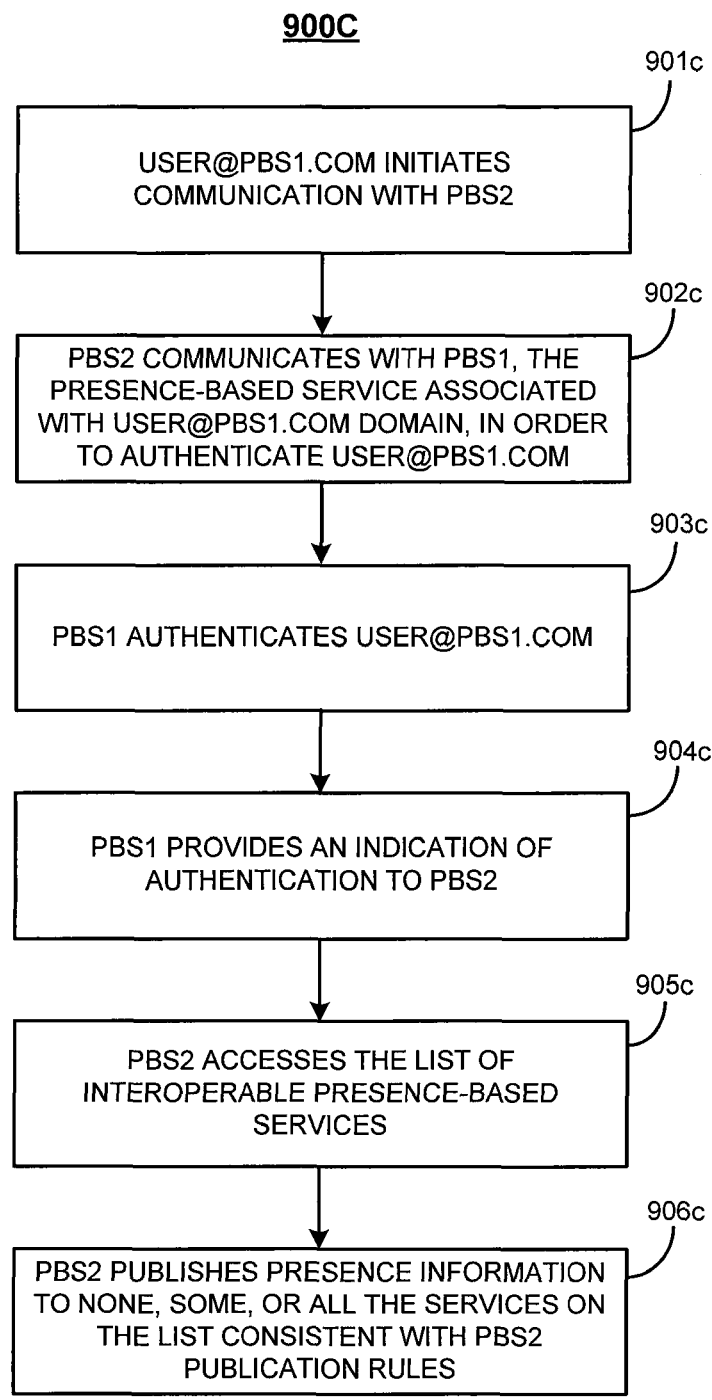

FIG. 8A illustrates a process 800A in which PBS2 130 accesses a local list of foreign interoperable presence-based services to publish the change in presence associated with the online identity to all or a subset of all the foreign interoperable presence-based services appearing on the list. Process 800A begins with the client system 110 initiating communication with PBS2 130. To that end, the computer operator may use a user interface, such as, for example, the user interface 400 of FIG. 4A to enter the online identity and credentials. In particular, for instance, the computer operator may enter user@PBS1.com within the screen name field of the user interface 400, enter the credentials associated with user@PBS1.com within the password field, and then select the "sign on" button within the user interface 400. The selection of the "sign on" button results in the client system 110 sending a request to PBS2 130 for access to PBS2 130, the request including the online identity and the credentials.

PBS2 130 receives the request and authenticates user@PBS1.com, without notifying or relying upon PBS1 120 (802*a*). For instance, PBS2 130 may authenticate user@PBS1.com using credentials stored in the credentials database 132*b* as a result of process 300C or 300D. After successful authentication of user@PBS1.com, PBS2 130 accesses a profile that includes a local list of foreign interoperable presence-based services (803*a*). The local list enables PBS2 130 to consult its own publication rules in publishing presence information to other services (804*a*). For example, PBS2 130 may publish the presence information to all of the foreign presence-based services on the list. Alternatively, PBS2 130 may publish the presence information to the presence-based services that are associated with the domain of the online identity, e.g., PBS1 120 in the example involving user@PBS1.com. Alternatively, PBS2 130 may publish the presence information to a subset or more of the services on the list. For instance, PBS2 130 may not provide access to presence information for its subscribers by subscribers of obscure services that do not have interoperability with PBS2 130 service or other services on the list.

In another implementation, PBS2 130 may provide its local list of interoperable services to a single or limited set of foreign presence-based service(s) (or proxy therefor) and request or rely upon the foreign presence-based service(s) (or proxy thereof) to publish the change in presence to other services. In yet another implementation, instead of or in addition to PBS2 130 accessing a list to identify other foreign interoperable presence-based services (e.g., PBS1 120) that may be interested in presence information associated with user@PBS1.com, PBS2 130 receives a request from other foreign interoperable presence based services, notifying PBS2 130 of their interest in presence information associated with user@PBS1.com.

Figure 8C:
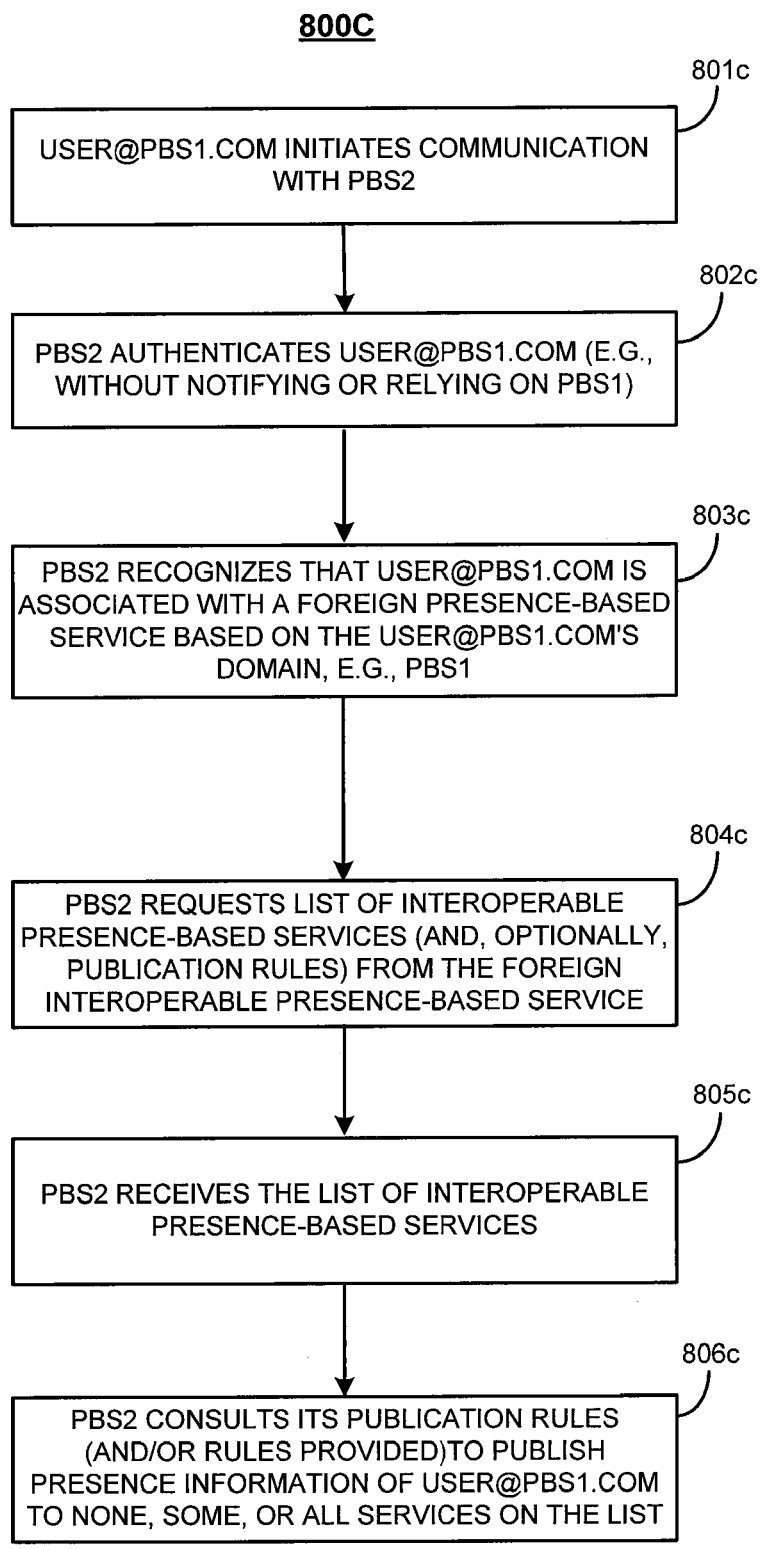

FIGS. 8B and 8C illustrate processes 800B and 800C performed when the list of interoperable services is stored at or accessed by a foreign presence-based service, e.g., PBS1 120. Referring to FIG. 8B, process 800B includes actions (801*b* and 802*b*) that are the same as actions (801*a* and 802*a*) of FIG. 8A and, as such, are previously described above with respect to actions (801*a* and 802*a*). After authenticating user@PBS1.com, PBS2 130 recognizes that user@PBS1.com is associated with a foreign presence-based service, e.g., PBS1 120, because of user@PBS1.com's domain (803*b*). Thus, PBS2 130 provides an indication of the authentication for user@PBS1.com to the foreign presence-based service that is associated with the user@PBS1.com's domain (804*b*). PBS2 130 optionally projects change in presence associated with user@PBS1.com to PBS2 subscribers (805*b*).

Upon being notified, the foreign presence-based service (e.g., PBS1 120) accesses list of interoperable presence-based services (806*b*) and the foreign presence-based service consults its publication rules and publishes the information in a manner consistent with its publication rules to none, some, or all of the services on a list located at or accessed by the foreign presence-based service (807*b*).

Alternatively, referring to FIG. 8C, PBS2 130 may request the list from the foreign presence-based service, and may itself publish to none, some, or all of the services on the list after consulting PSB2 130 (or foreign-provided) publication rules as shown in FIG. 8C. FIG. 8C illustrates a process 800C used by PBS2 130 to request a list of interoperable presence-based services (and optionally, publication rules) from the foreign interoperable presence-based service and to publishes to none, some, or all of the services on the list. Actions (801*c*-803*c*) of the process 800C are similar to the actions (801*b*-803*b*) of the process 800B, and, as such, are previously described with respect to actions (801*b*-803*b*).

Process 800C differs from process 800B in that in process 800C, PBS2 130 does not rely on PBS1 120 for publication. Instead, PBS2 130 requests the list of interoperable presence-based services (and, optionally, publication rules) from the foreign interoperable presence-based service (804*c*). PBS2 130 receives the list of interoperable presence-based services (805*c*), and PBS2 130 consults its publication rules (and/or rules provided) to provide presence information of user@PBS1.com to none, some or all services on the list (806*c*).

FIGS. 9A-9C illustrate processes 900A-900C, respectively, in which the foreign interoperable presence-based service (e.g., PBS1 120) is informed of change in presence of an online identity, user@PBS1.com, by virtue of having to authenticate user@PBS1.com. Specifically, FIG. 9A illustrates process 900A in which PBS2 130 solicits PBS1 120 to authenticate a computer operator using an online identity and to publish the presence information associated with the online identity. Process 900A begins with client system 110 initiating communication with PBS2 130 using the online identity, user@PBS1.com (901*a*). In response, PBS2 130 communicates with PBS1 120, the presence-based system associated with the user@PBS1.com,s domain, to authenticate user@PBS1.com (902*a*). In one example, PBS2 130 may submit to PBS1 120 the online identity and the credentials associated therewith and may request PBS1 120 to carryout the authentication step, as shown by process 300B of FIG. 3B. PBS1 120 then authenticates user@PBS1.com (903*a*). In another implementation, PBS2 130 may request the credentials information from PBS1 120 and PBS2 130 uses the credentials information to authenticate the online identity, as shown by process 300C of FIG. 3C. PBS2 130 then regulates access to the client system based on the authentication. PBS2 130 also may project changes in presence experienced by the online identity to its subscribers.

After authentication, PBS1 120 accesses a list of interoperable presence-based services that is stored at PBS1 120 (904*a*). PBS1 120 consults its publication rules and publishes the presence information associated with the online identity to none, some, or all of the presence-based services on the list accordingly (905*a*). In one implementation, PBS1 120 does not publish the change in presence to PBS2 130 because PBS2 130 has already projected this information to its subscribers.

Referring to FIGS. 9B-9C, the list of interoperable services is not stored at PBS1 120 (or at least not relied upon from PBS1 120), and PBS1 120 either requests the list from PBS2 130 or provides PBS2 130 with authentication information so that PBS2 130 can publish the change in presence to one or more interoperable services. Specifically, FIG. 9B illustrates process 900B in which PBS1 120 requests the list from PBS2 130 and PBS1 120 publishes to none, some, or all of the interoperable presence-based services that are on the list in a manner consistent with PBS1 120 publication rules. Process 900B includes actions (901*b*-903*b*), which are the same as actions (901*a*-903*a*) and, as such, are previously described with respect to actions (901*a*-903*a*). Process 900B differs from process 900A in that in process 900B, PBS1 120 requests a list of interoperable presence-based services from PBS2 130 (904*b*). PBS2 130 provides the list to PBS1 120 (905*b*), and PBS1 120 publishes the presence information associated with the online identity to none, some, or all the services on the list consistent with PBS1 120 publication rules (906*b*). Alternatively, PBS1 120 may access PBS2 130 publication rules and publish the change in presence to none, some, or all of the interoperable presence-based services that are on the list in a manner consistent with PBS2 130 publication rules.

Referring to FIG. 9C, PBS1 120 provides a notification of authentication to PBS2 130, and PBS2 130 publishes to the interoperable presence-based services that are on the list consistent with PBS2 130 (or foreign-provided) publication rules. Process 900C includes actions (901*c*-903*c*), which are the same as actions (901*a*-903*a*) and, as such, are previously described with respect to actions (901*a*-903*a*). Process 900C is different from processes 900A and 900B because, in process 900C, PBS1 120 provides an indication of authentication to PBS2 130 (904*c*) and PBS2 130 accesses the list of interoperable presence-based services (905*c*) and publishes the presence information to none, some, or all the services on the list consistent with PBS2 130 publication rules (906*c*).

Figures 10, 11:
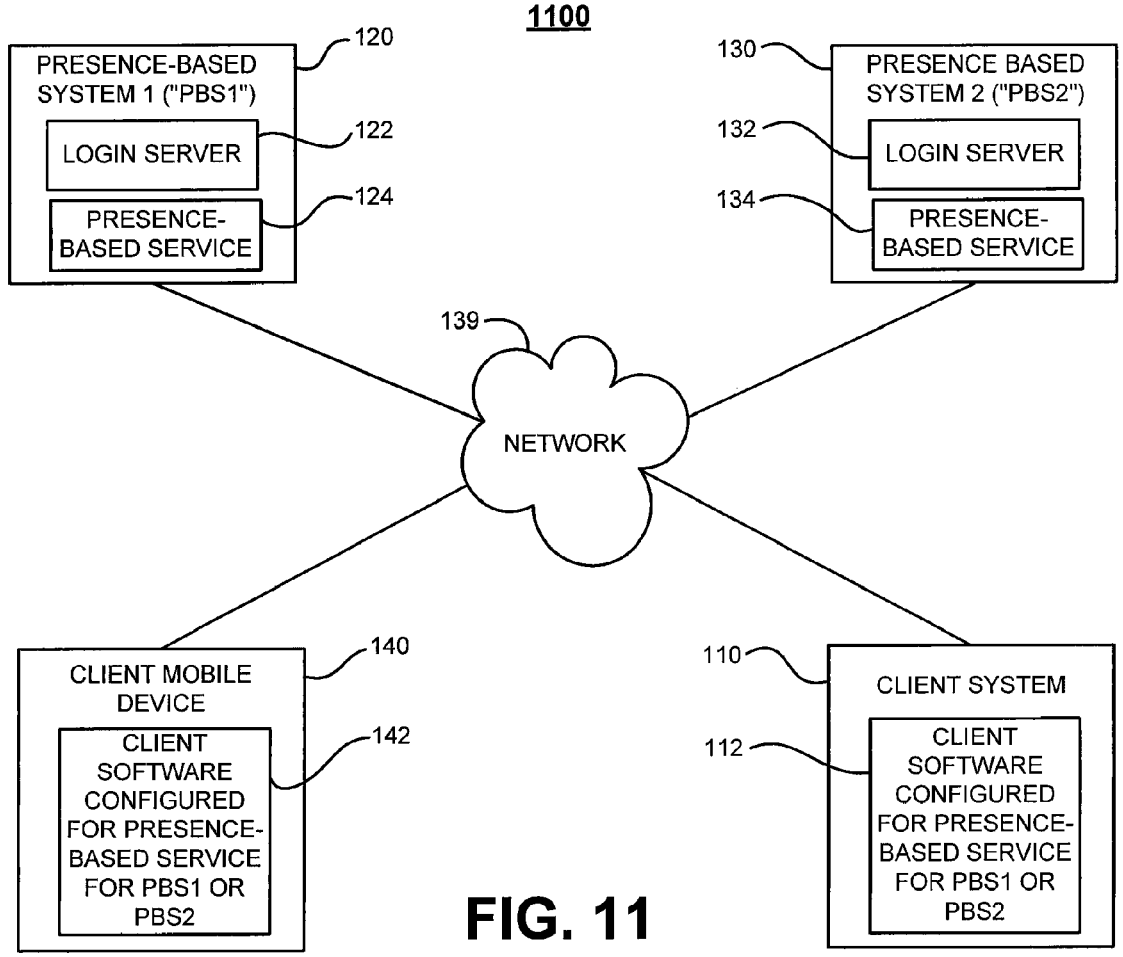
FIG. 10 illustrates an example of a table containing presence information.
FIG. 11 illustrates an open name space network that includes a client mobile device.

During the publication processes illustrated by FIGS. 8A-8C and 9A-9C, the information that is published can include the online identity (e.g., e-mail address), reference ID, and identity of service through which login was achieved (e.g., PBS2), among other information. As shown in FIG. 10, a table 1000 of such information may be maintained at all interoperable systems, or some subset or proxy therefor (e.g., in the domain services only). This information may be used to assist the services to keep track of the local presence of the online identity for purposes of delivering messages to the online identity as described further below.

Figure 12:
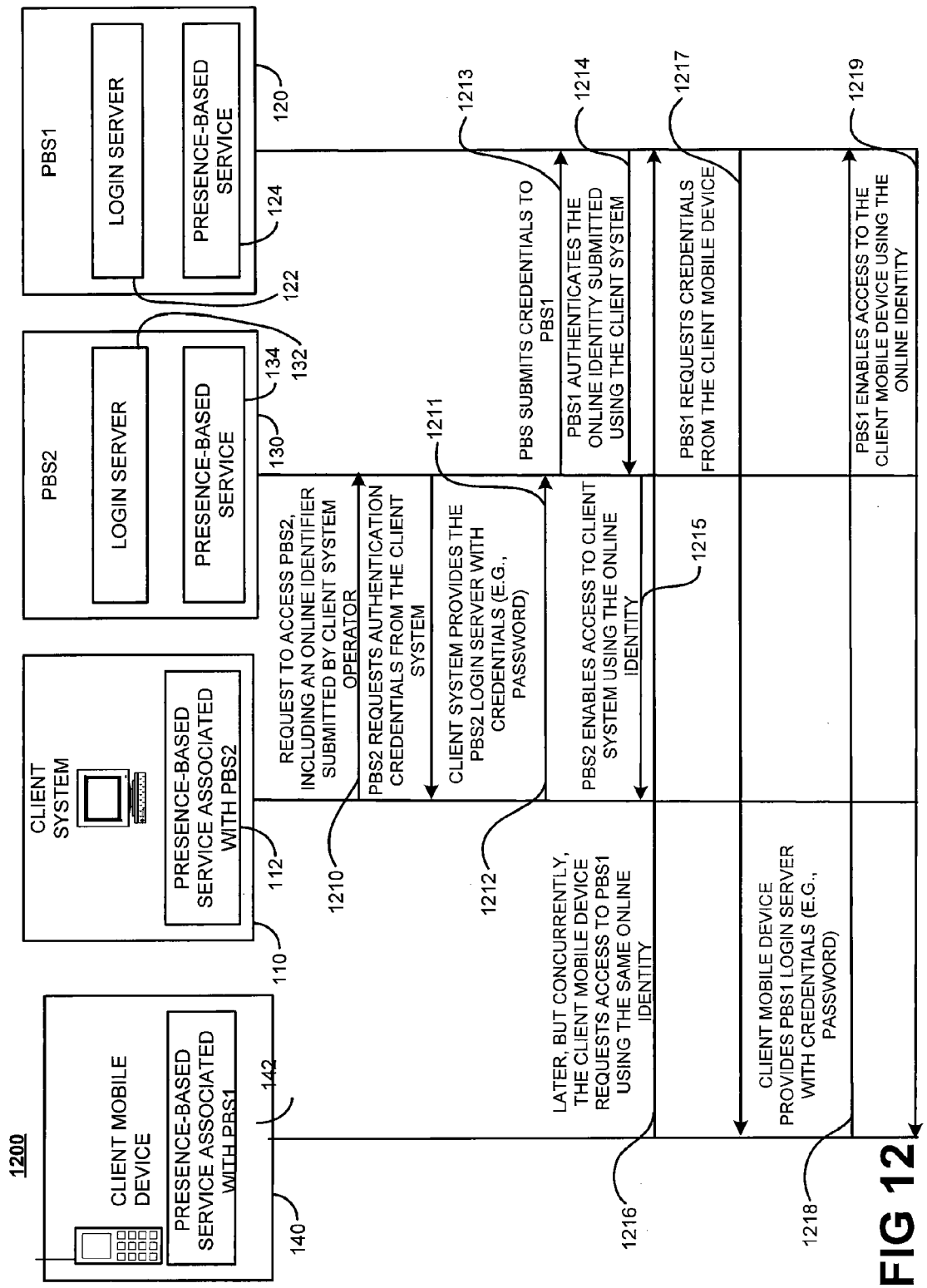
FIG. 12 illustrates a process for allowing a computer operator using an online identity to gain access to PBS2, and later, but concurrently, a client mobile device operator using the same online identity to gain access to PBS1.

Referring to FIG. 11, an open name space network 1100 is similar to that of FIG. 1 but includes a client mobile device 140. The client mobile device 140 includes client software 142 configured for presence-based service associated with PBS1 120 or PBS2 130. The presence-based systems 120 and 130 are configured to perform several operational acts to manage a situation in which online presence for an online identity (e.g., user@PBS1.com in keeping with previous examples) is already established by a first presence-based service and published by that service to a second presence-based service, and concurrently, the online identity is used to gain access to a second interoperable presence-based service at one of its client locations or devices or at another client location or device of the first interoperable presence-based service. For example, as shown in FIG. 12, when a computer operator submits user@PBS1.com in attempting to register its online presence with presence-based service 134 offered by PBS2 130, PBS2 130 authenticates and provides access to the computer operator as described previously. Thereafter, if a client mobile device 140 is used by the operator to submit user@PBS1.com while attempting to access PBS1 120, PBS1 120 authenticates and provides access to the operator of the client mobile device.

In particular, FIG. 12 illustrates a process 1200 in which the client system 110 submits a request to access PBS2 130 using an online identity, user@PBS1.com (1210). In response, PBS2 130 requests authentication credentials from the client system 110 (1211). The operator of the client system 110 provides the credentials, which are submitted to PBS2 130 (1212).

Upon receiving the credentials, PBS2 130 submits the credentials (and online identity) to PBS1 120 (1213). PBS1 120 authenticates user@PBS1.com and notifies PBS2 130 that it has authenticated user@PBS1.com (1214). In response, PBS2 130 enables the client system 110 to access PBS2 130 using user@PBS1.com (1215).

Later, but concurrently, the client mobile device 140 requests access to PBS1 120 using the same online identity (e.g., user@PBS1.com) (1216). In response, PBS1 120 requests credentials from the client mobile device 140 (1217), and the operator of the client mobile device 140 provides the credentials, which are submitted to PBS1 120. The login server 122 authenticates the online identity and enables the client mobile device 140 to access PBS1 120 using the online identity (1219).

Figure 13A:
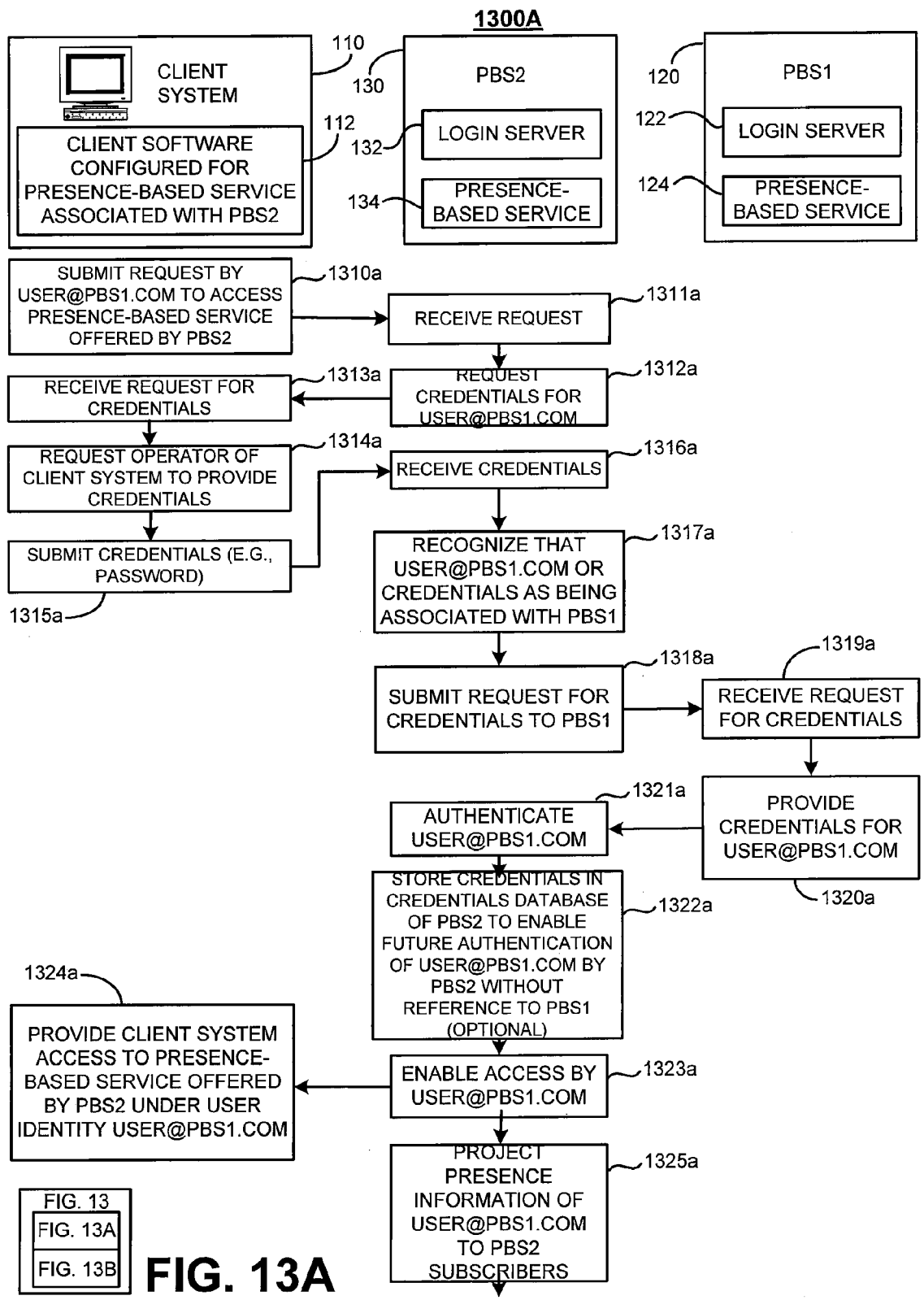

A process 1300A shown by FIG. 13A, while similar in some respects to the process 1200 of FIG. 12, provides a more detailed example of authenticating and authorizing the client system 110 to access PBS2 130 using the online identity, user@PBS1.com. Process 1300A includes actions (1310a-1325a) which are the same as actions (310c-325c) described with respect to process 300C of FIG. 3C. As such, the actions (1310a-1325a) of process 1300A are not described here in further detail. Referring to FIG. 13B, process 1300A continues with PBS2 130 publishing presence information to one or more interoperable presence-based services (e.g., PBS1 120) (1327a). As a result, PBS1 120 receives publication of the presence information of the online identity (1328a). Among other features, this may enable PBS1 120 to inform its subscribers of the presence information. PBS1 120 and PBS2 130 may increment a counter or update a table in order to keep track of the number of times (and specifics therefor) the online identity is used to log into one or more presence-based services or devices and device types (1329a and 1330a).

Figure 14:
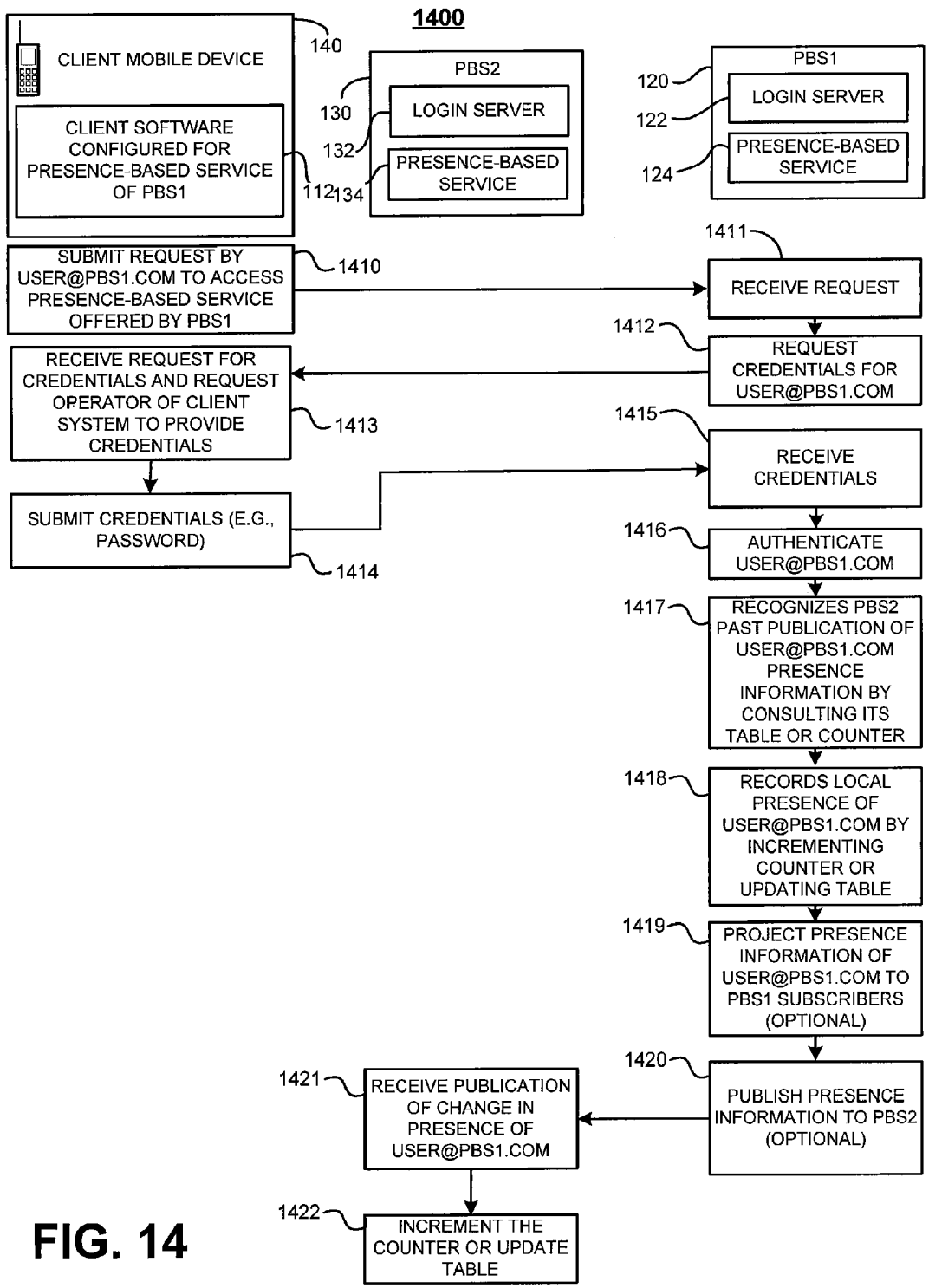
FIG. 14 illustrates a process for authenticating and authorizing the operator of the client mobile device of FIG. 12 to access PBS1, optionally projecting changes in presence to PBS1 subscribers, and optionally publishing changes in presence to PBS2.

Referring to FIG. 14, a process 1400 is similar in some respects to the process 1200 of FIG. 12, but provides a more detailed example of authenticating and authorizing the client mobile device 140 to access PBS1 120 using the online identity, user@PBS1.com. Process 1400 begins with the client mobile device 140 submitting a request to access presence-based service 124 offered by PBS1 120 (1410). The request includes the online identity, user@PBS1.com. In one example, the operator of the client mobile device 140 uses the client software 142 associated with the presence-based service 124 to submits its request. PBS1 120 receives the request (1411) and, in response, requests credentials for user@PBS1.com (1412). The client mobile device 140 receives the request for credentials and requests the credentials from the operator of the client mobile device 140 (1413). The operator of the client mobile device 140 provides the credentials, which are submitted to PBS1 120 (1414).

PBS1 120 receives the credentials (1415) and authenticates user@PBS1.com (1416). Additionally, PBS1 120 may recognize PBS2 130's past publication of presence information for user@PBS1.com by consulting its table or counter (1417). After detecting past publication of presence for the online identity (e.g., by consulting its table or counter), PBS1 120 records the local presence of the user@PBS1.com by incrementing its counter or adding a new row to its table (1418). PBS1 120 optionally projects the change in presence to PBS1 120 subscribers (1419), and/or optionally publishes the change in presence to other services such as the presence-based service of PBS2 130 (1420). If PBS1 120 choose to publish the change in presence to PBS2 130, then PBS2 130 receives publication of change in presence associated with user@PBS1.com (1421) and increments its counter or updates its table to record the presence of user@PBS1.com at PBS1 120 (1422).

Figure 15:
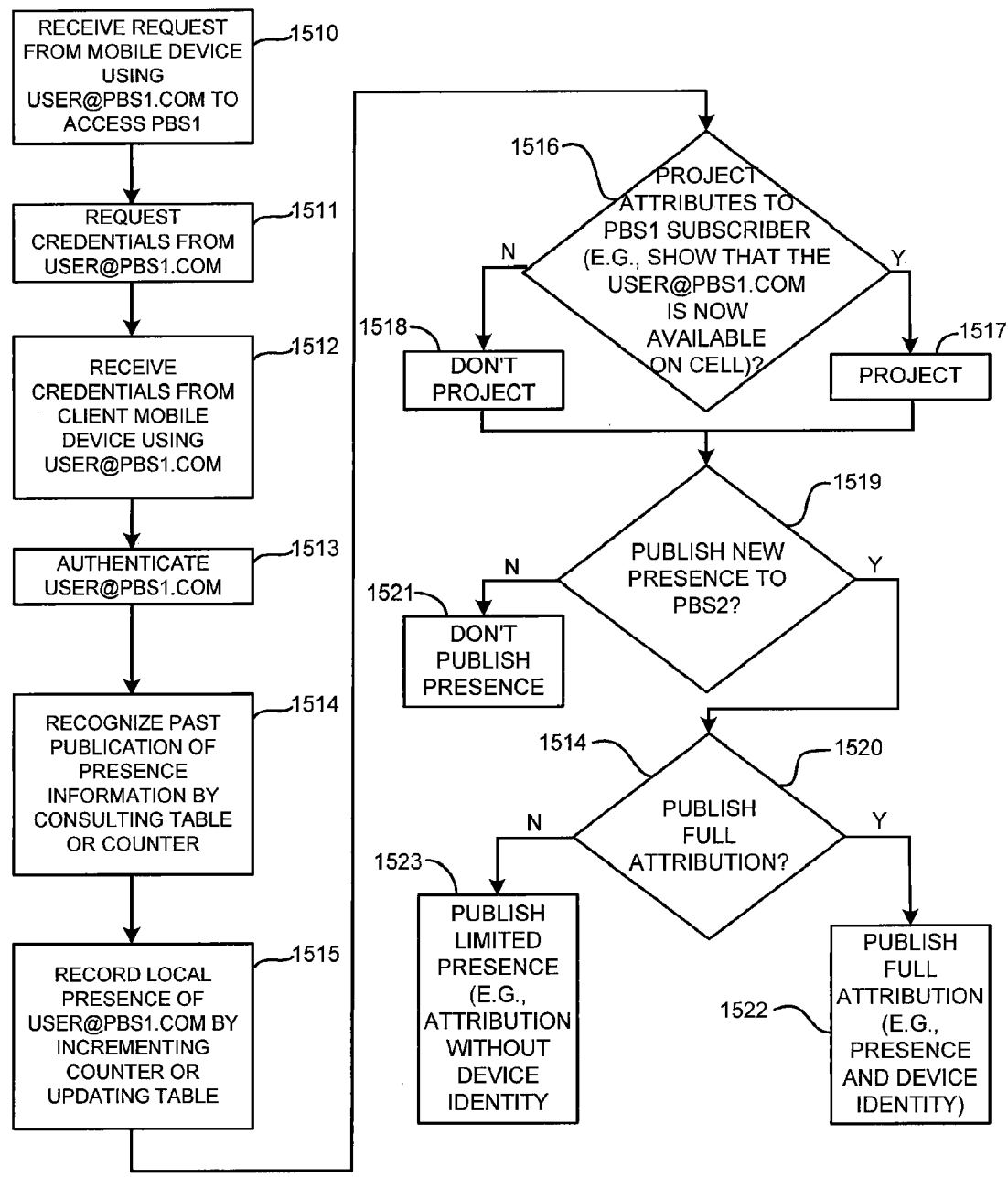
FIG. 15 illustrates a process for PBS1 to publish full attribution or limited attribution of changes in presence.

Referring to FIG. 15, PBS1 120 may publish full attribution or limited attribution of changes in presence, as shown by process 1500. Process 1500 begins with PBS1 120 receiving a request from the client mobile device 140 to access PBS1 120 using the online identity, user@PBS1.com (1510). In response, PBS1 120 requests for credentials from the client mobile device 140 and receives credentials from the client mobile device 140 (1512). PBS1 120 authenticates user@PBS1.com (1513) and recognizes past publication of change in presence associated with user@PBS1.com by consulting its table or counter (1514). PBS1 120 records local presence of user@PBS1.com by incrementing its counter or updating its table (1515). Then, PBS1 120 determines whether to project attributes to PBS1 120 subscribers (1516). For example, this may include showing to the subscribers that user@PBS1.com is now available on the client mobile device 140. Based on this determination, PBS1 120 either projects the presence information to its subscriber (1517) or it does not (1518). PBS1 120 determines whether to publish the presence information to another interoperable presence-based system (e.g., PBS2 130) (1519). Based on a positive determination, PBS1 120 either publishes a full attribution (1522) or a limited attribution (1523). The limited attribution publication of presence information may include publishing the new presence of the online identity without the indication of the client device the operator used to log into the PBS1 presence-based service 122. The full attribution publication of the presence information may include publishing the new change in presence of the online identity and the identity of the client device the operator used to access the PBS1 presence-based service 122.

Figure 16A:
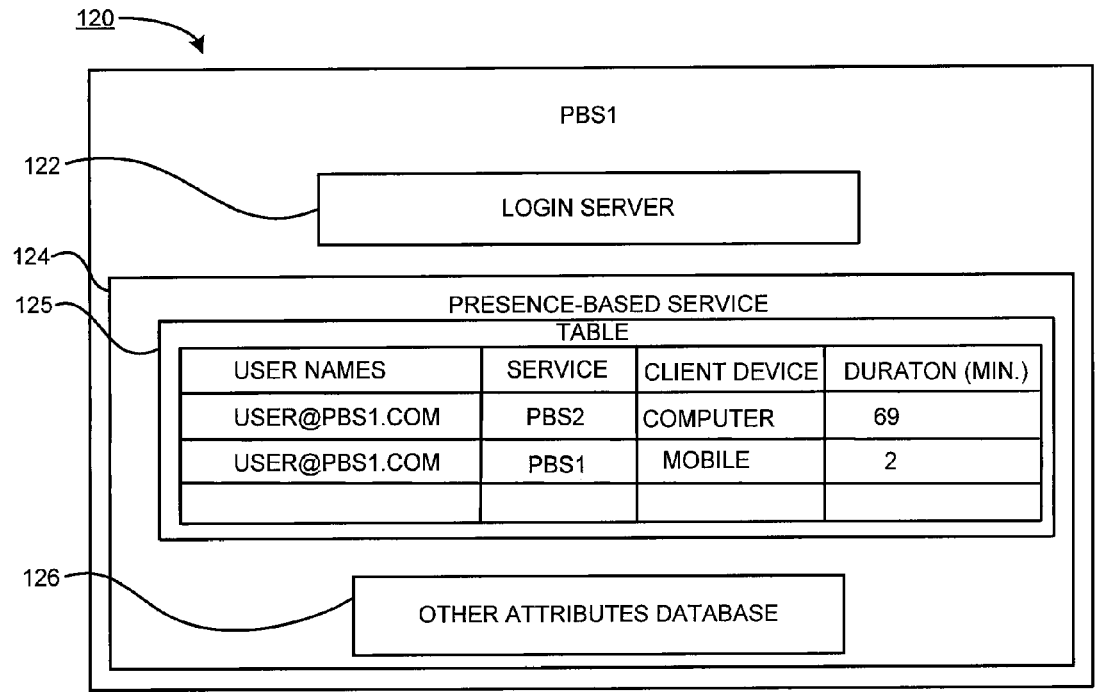
FIG. 16A illustrates an example of a table storing presence information.
Figure 16B:
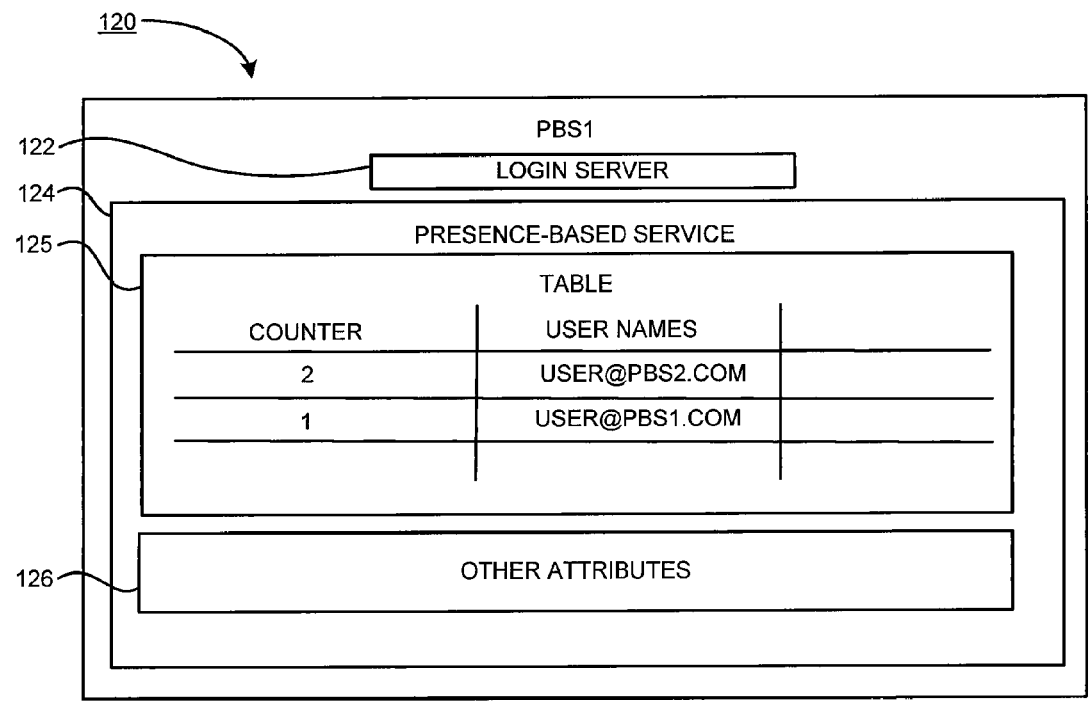
FIG. 16B illustrates an example of a counter used to track when an online identity is used to access one or more presence-based systems.

FIGS. 16A and 16B illustrate an example of a table 125 stored in presence-based service of PBS1 120. Referring to FIG. 16A, a table 125 includes information such as an online identity (e.g., e-mail address), identity of the service through which login was achieved, identity of a client device the operator used to access the service, and duration of online presence by the online identity. Referring to FIG. 16B, a table 125 includes a counter and a list of online identities. For instance, the counter shows that one or more client devices uses an online identity, user@PBS2.com, multiple times to gain access to one or more interoperable presence-based services.

PBS1 120 and PBS2 130 may be configured to utilize information within these tables for several reasons or in various contexts. First, this information may be used to track the past publication of presence information corresponding to the online identity, and to determine whether a new publication is necessary when the online identity is used to again log into one or more presence-based interoperable services or devices. Second, this information may be used to track the number of times the online identity is used to log into one or more different interoperable services so that log off from less than all of the services or device types does not cause premature perception of a complete loss of online presence. Third, updating the table with the information such as the online identity and service of login allows the interoperable services to easily determine whether or where to send traffic that is directed from their subscribers to the online identity as described further below.

Figure 16C:
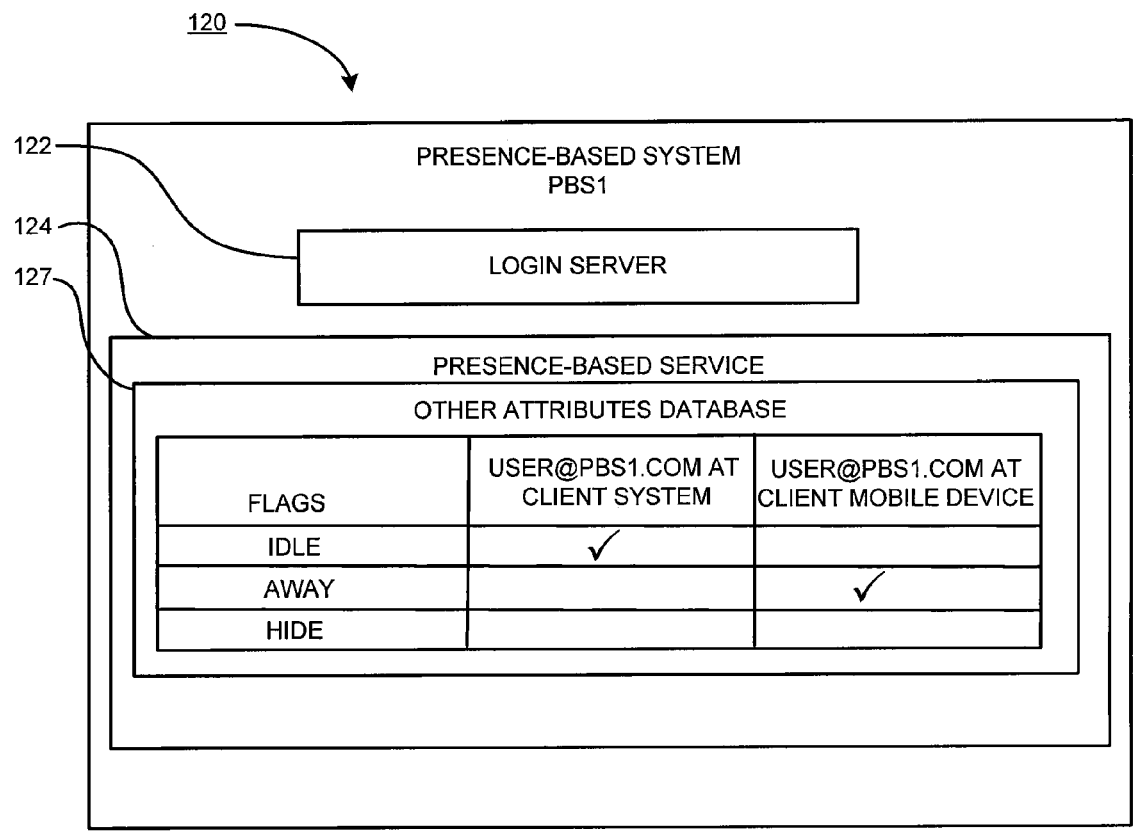
FIG. 16C illustrates an example of a table storing presence information.

Referring to FIG. 16C, the PBS1 presence-based service 124 also includes other attributes database 127. The other attributes database 127 keeps track of other presence information. For example, FIG. 16C reveals that a user@PBS1.com is logged into PBS1 120 via the client system 110, and the user@PBS1.com does not have an active presence at the client system 110, e.g., the user@PBS1.com is idle. Similarly, FIG. 16C reveals that user@PBS1 is also logged into PBS1 120 via the client mobile device 140, and the user@PBS1.com is away from the client mobile device

140. The PBS1 presence-based service 124 may project this information to its subscribers. Additionally, the PBS1 presence-based service 124 may publish this information to other interoperable presence-based services.

Figure 17A:
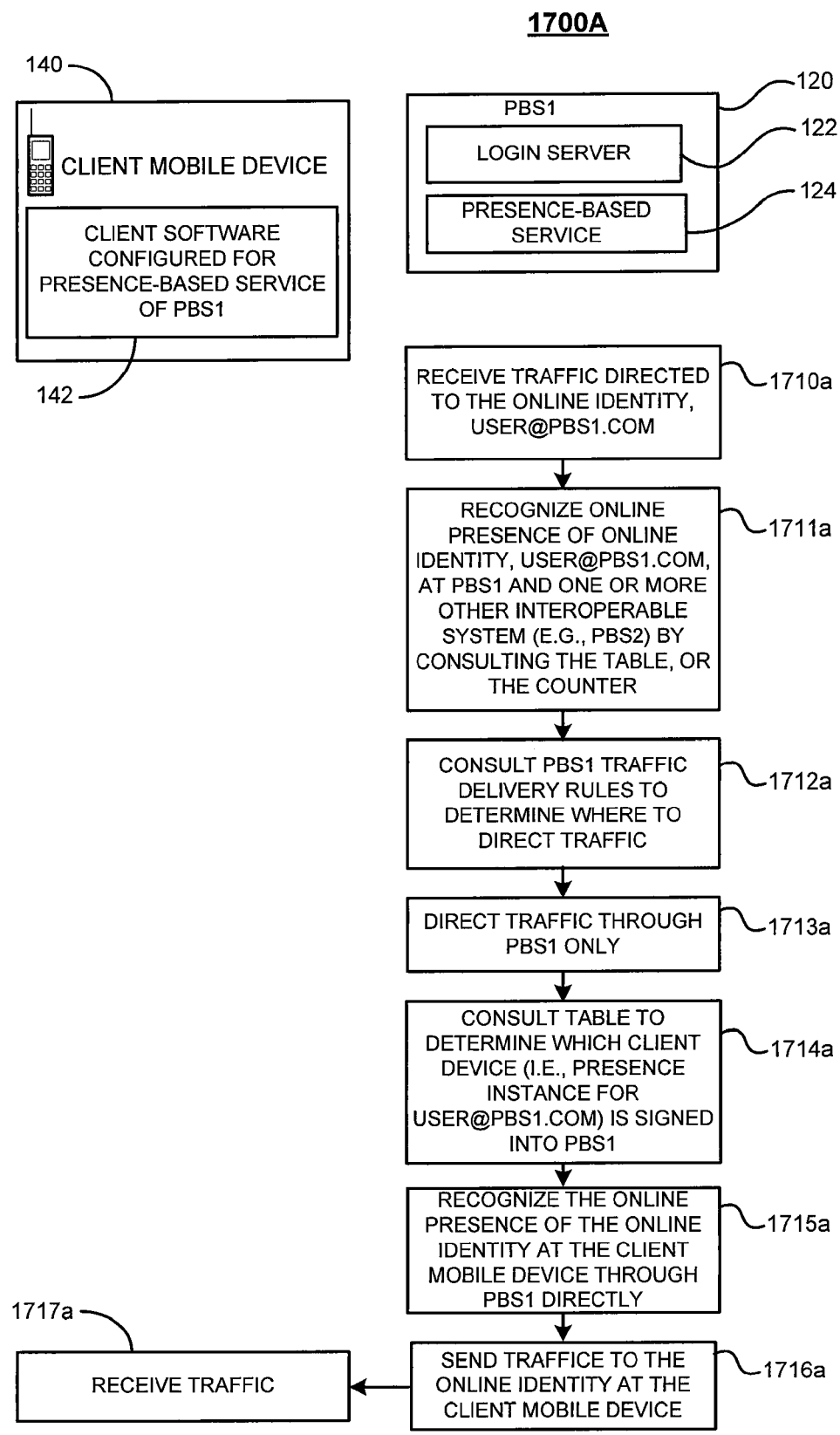
FIGS. 17A-17C illustrate various methods for delivering traffic to an online identity at multiple client devices through PBS1 and/or PBS2.
Figure 17B:
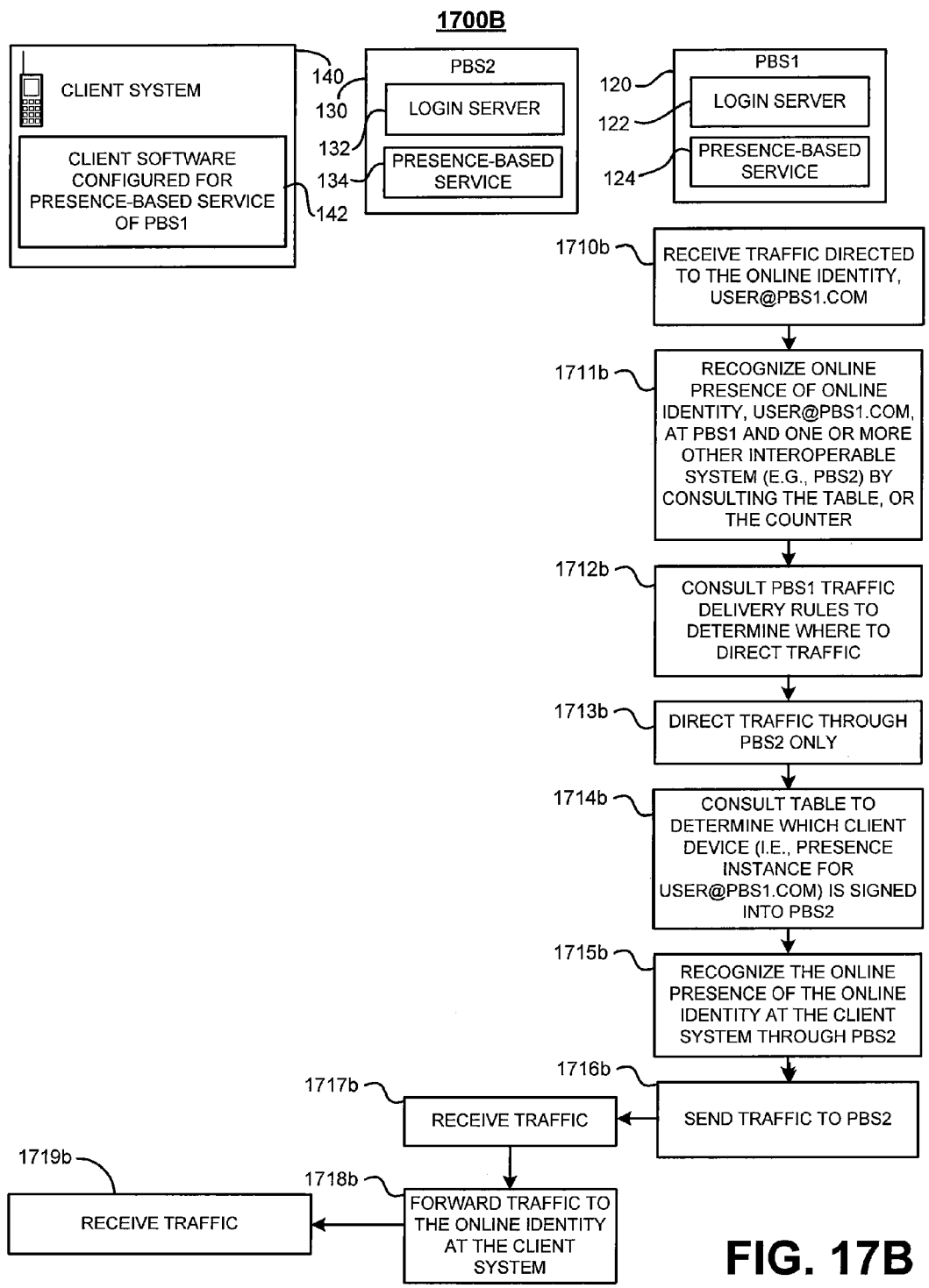
Figure 17C:
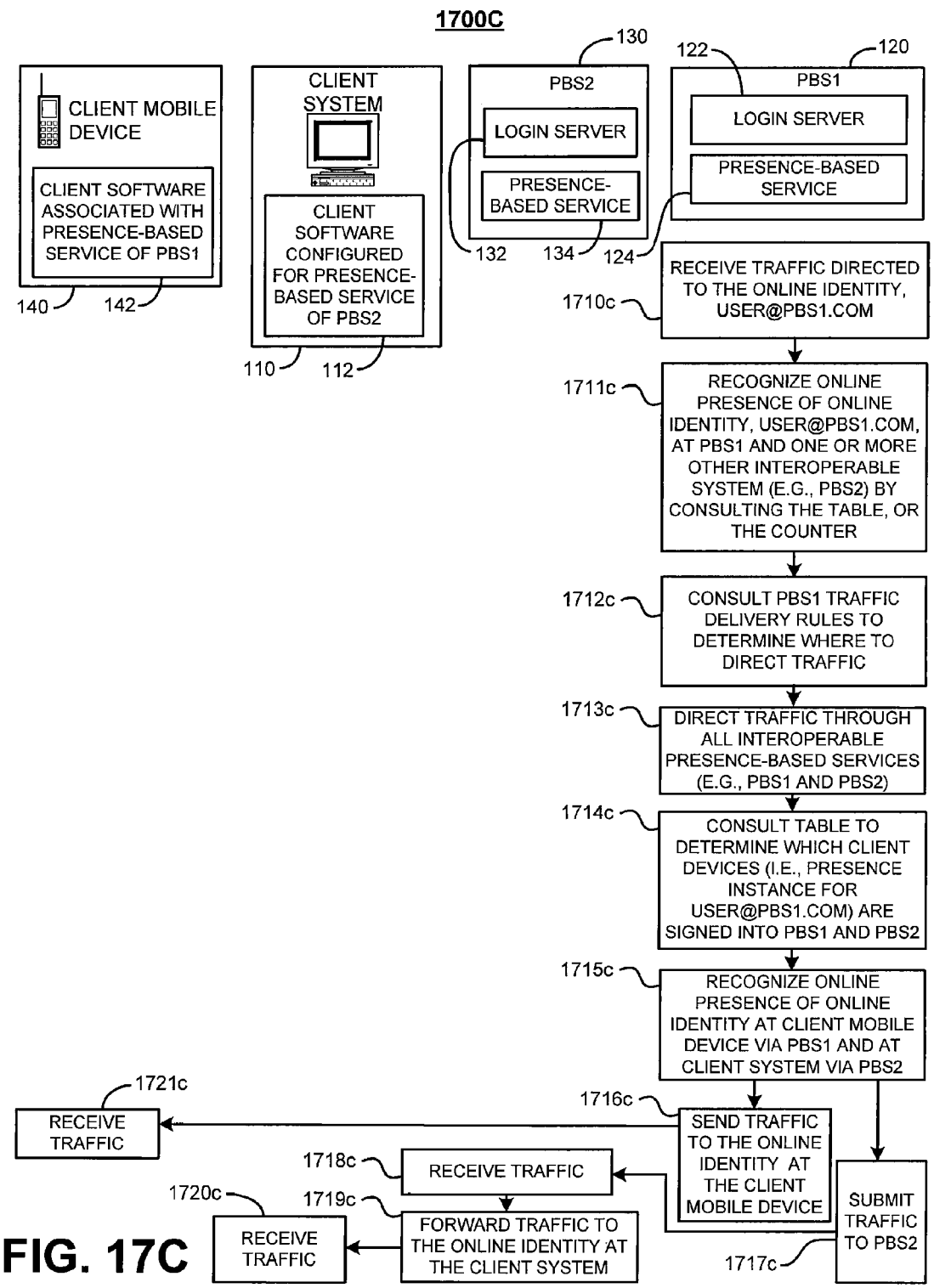

At the conclusion of processes illustrated in FIGS. 13A and 13B, 14, and 15, PBS1 120 has several options for delivering traffic to the online identity, as shown by processes 1700A-1700C of FIGS. 17A-17C. More specifically, for purposes of description, it is assumed that the presence-based service 124 offered by PBS1 120 recognizes the online identity as having presence directly through PBS1 120 and indirectly through PBS2 130, e.g., via a communication from PBS2 130 to PBS1 120 that results from interoperability between the systems in response to the user having signed into PBS2 130 (shown in FIG. 13A-13B). Because a direct and an indirect presence are both recognized, when traffic from PBS1 120 subscribers is directed to an online identity whose domain is PBS1 120, such as user@PBS1.com, PBS1 120 has options of (1) sending the traffic directly, meaning through the PBS1 presence-based service 124, to the online identity such that the traffic is received by the online identity at client devices through which the user logged directly into PBS2 130 (e.g., the client mobile device in FIG. 12), as shown in FIG. 17A; (2) sending the traffic indirectly, meaning through PBS2 130, to the online identity such that the traffic is received by the online identity at client devices through which the user logged indirectly into PBS1 120 (e.g., the client system 110 in FIG. 12), as shown in FIG. 17B, or (3) sending the traffic to presence-based services of both PBS1 120 and PBS2 130, such that the online identity receives it at client devices that leverage PBS1 120 and those that leverage other domains and associated software (e.g., the client mobile device 140 and the client system 110 in FIG. 12), as shown in FIG. 17C.

Below, FIGS. 17A-17C are each described in more detail. FIG. 17A illustrates a process 1700A that is used by PBS1 120 to send the traffic from PBS1 120 subscribers directly to the online identity such that the traffic is received by the online identity at a client device (e.g., the client mobile device 140) through which the user logged directly into PBS1 120. Process 17A begins with PBS1 120 receiving, from at least one of its subscribers, traffic directed to the online identity, user@PBS1.com (1710a). By consulting a table or a counter, PBS1 120 recognizes online presence of user@PBS1.com at PBS1 120 and one or more other interoperable presence-based systems (e.g., PBS2 130) (1711a). The table may include the either of the example tables 125 shown in FIGS. 16A and 16B, or some combination thereof.

PBS1 120 consults PBS1 120 traffic delivery rules to determine where to direct the traffic (1712a). In one implementation and as shown in FIG. 17A, the traffic delivery rules may indicate delivery of traffic only through PBS1 120 (1713a). In accordance with the traffic delivery rule, PBS1 120 consults its table to determine which client device is being used to access PBS1 120 (1714a). PBS1 120 recognizes the online presence of the online identity at the client mobile device 140 through PBS1 120 directly (1715a) and, according to the traffic delivery rules, sends the traffic to the online identity at the client mobile device 140 (1716a). The client mobile device 140 receives the traffic (1717a). As such, in this implementation, only the client mobile device 140 receives the traffic.

FIG. 17B illustrates an example of a process 1700B that is used by PBS1 120 to send the traffic from PBS1 120 indirectly to the online identity such that the traffic is received by the online identity at a client device (e.g., the client system 110 of FIG. 12) accessing PBS2 130. Process 1700B includes actions (1710b-1713b), which are the same as actions (1710a-1712a) illustrated in process 1700A of FIG. 17A and, as such, are previously described with respect to actions (1710a-1712a). Process 1700B is different from process 1700A because in process 1700B the traffic delivery rules instruct PBS1 120 to direct the traffic only through PBS2 130 (1713b), whereas in process 1700A the traffic delivery rules instruct PBS1 120 to direct the traffic only through PBS1 120.

PBS1 120 therefore consults its table to determine which client device is being used to access PBS2 130 (1714b). PBS1 120 recognizes the online presence of the online identity at the client system 110 through PBS2 130 (1715b), and sends the traffic to PBS2 130 (1716b). PBS2 130 receives the traffic (1717b) and forwards the traffic to the online identity at the client system 110 (1718b). As such, in this implementation, only the client system 110 receives the traffic (1719b).

FIG. 17C illustrates an example of a process 1700C that is used by PBS1 120 to send the traffic to client devices accessing both PBS1 120 and PBS2 130 using the online identity, such that the traffic is received at a client device (e.g., the client mobile device 140) that leverage PBS1 120 and a client device (e.g., the client system 110) that leverage PBS2 130. The actions (1710c-1712c) of process 1700C is the same as actions (1710a-1712a) and, as such, are not described here in more detail. In process 1700C, the traffic delivery rules instruct PBS1 120 to direct traffic through all interoperable presence-based services (e.g., PBS1 120 and PBS2 130).

PBS1 120 consults its table to determine which client devices are accessing PBS1 120 and PBS2 130 (1714c). PBS1 120 recognizes online presence of the online identity at the client mobile device 140 via PBS1 120 and at the client system 110 via PBS2 130 (1715c). As such, PBS1 120 sends the traffic to the online identity at the client mobile device (1716c) and submits the traffic to PBS2 120 for delivery to the client system 110 (1717c). PBS2 130 receives the traffic (1718c) and forwards the traffic to the online identity at the client system 110 (1719c).

Therefore, in this implementation, the traffic is delivered to both the client system 110 and the client mobile device 140 (1720c and 1721c).

In a slightly modified scenario where a traffic originates from a PBS2 130 subscriber, it may be routed directly to user@PBS1.com via PBS2 130. Additionally, PBS2 130 may inform PBS1 120 of such communication. In particular, PBS2 130 may inform PBS1 120 that a traffic was communicated to its online identity. The information may include the online identity, identity of the sender and the time and date the traffic was sent to user@PBS1.com. In this manner, PBS1 120 is enabled to keep track of the traffic that is being sent to user@PBS1.com regardless of whether the traffic delivery rules specify that the traffic should go through PBS1 120 and/or PBS2 130 to reach user@PBS1.com.

Figure 18:
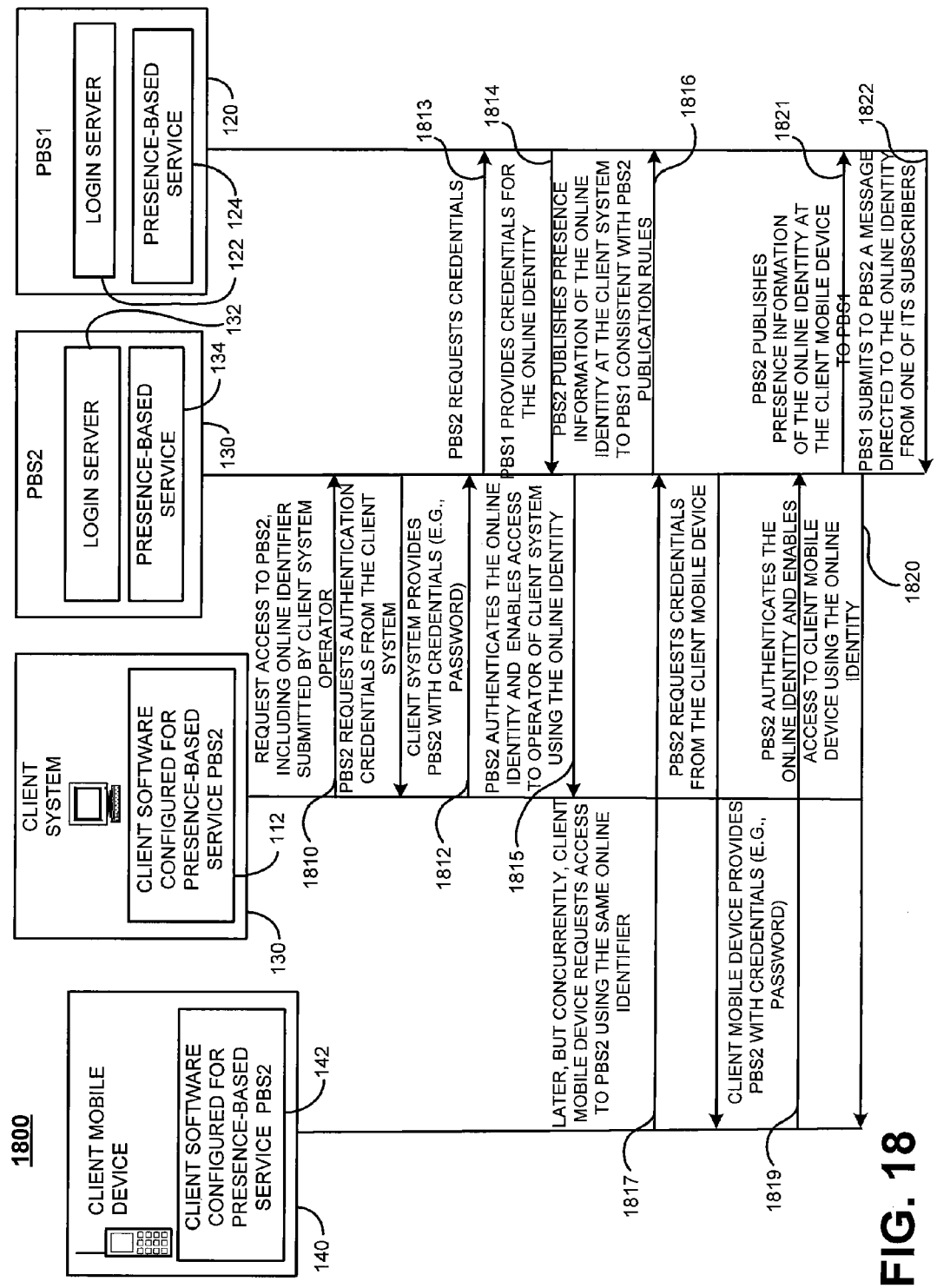
FIG. 18 illustrates a process for allowing a computer operator using an online identity to gain access to PBS2, and later, but concurrently, a client mobile device operator using the same online identity to gain access to PBS2.

Referring to FIG. 18, a process 1800 is shown in which the client system 110 and the client mobile device 140 uses an online identity, user@PBS1.com, to access a presence-based service 134 of PBS2 130. Process 1800 begins with the client system 110 requesting access to PBS2 130 using user@PBS1.com (1810). As suggested with respect to FIG. 3B, a login server 132 of PBS2 130 authenticates the online identity at client system 110 (1811-1815), and a presence-based service 134 of PBS2 130 projects presence information of the online identity at the client system 110 to PBS2 130 subscribers. As suggested with respect to FIGS. 8A and 8C, the presence-based service 134 of PBS2 130 also publishes the changes in presence of the online identity at the client system 110 to PBS1 120 consistent with PBS2 130 publication rules (1816). PBS1 120 may project the changes in presence to its subscribers.

Later, but concurrently, the client mobile device 140 requests access to PBS2 130 using the same online identity, user@PBS1.com (1817). As suggested with respect to FIG. 3D, the login server 132 of PBS2 130 authenticates the online identity (1818-1820), and the presence-based service 134 of PBS2 130 projects changes in presence of the online identity at the client mobile device 140 to PBS2 130 subscribers. As suggested with respect to FIGS. 8A and 8C, the presence-based service 134 of PBS2 130 also publishes the changes in presence of the online identity at the client mobile device 140 to PBS1 120 consistent with PBS2 130 publication rules (1821). Upon being informed of the changes in presence, a PBS1 120 subscriber may send a message to user@PBS1.com. The message may be configured for limited traffic delivery according to the traffic delivery rules hosted by PBS1 120. There are many methods that may be used to communicate the traffic delivery rules hosted by one presence-based system, e.g., PBS1 120, to one or more other presence-based systems, e.g., PBS2 130, thereby allowing those rules to be applied by the other systems or domains in effecting the desired traffic routing.

Figure 19A:
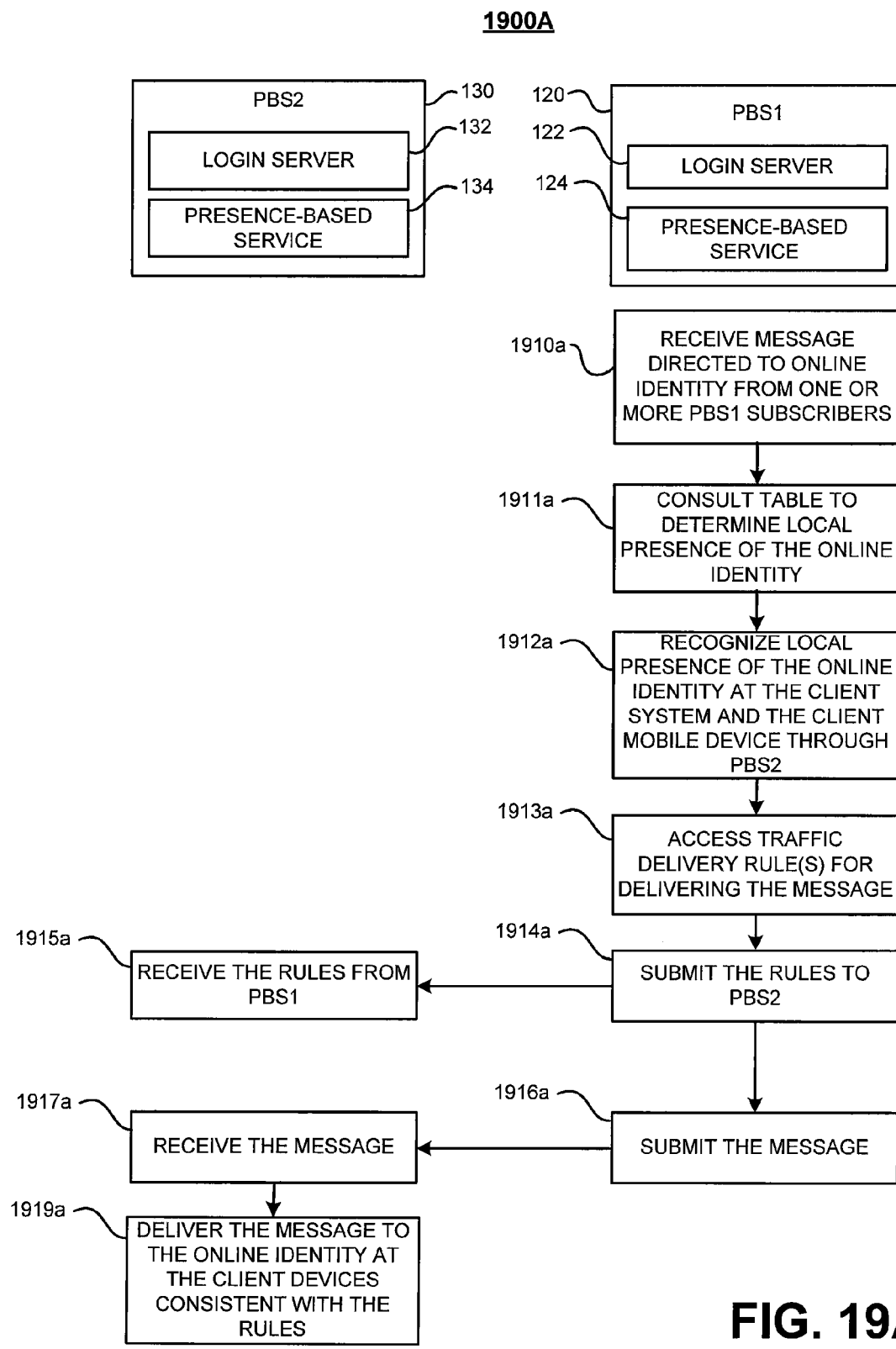
FIGS. 19A-19C illustrate various methods for communicating traffic delivery rules hosted by PBS1 to PBS2.
Figure 19B:
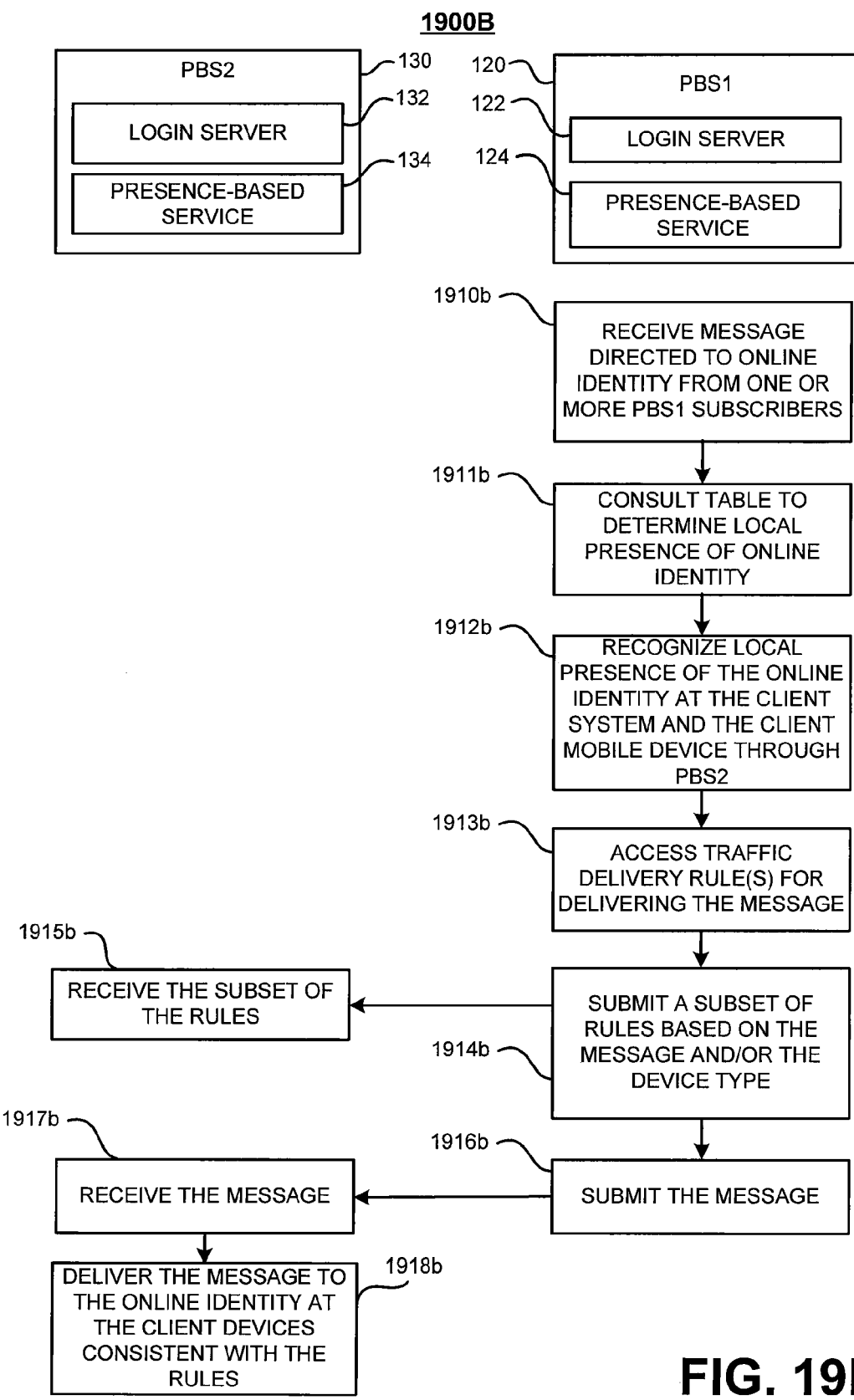
Figure 19C:
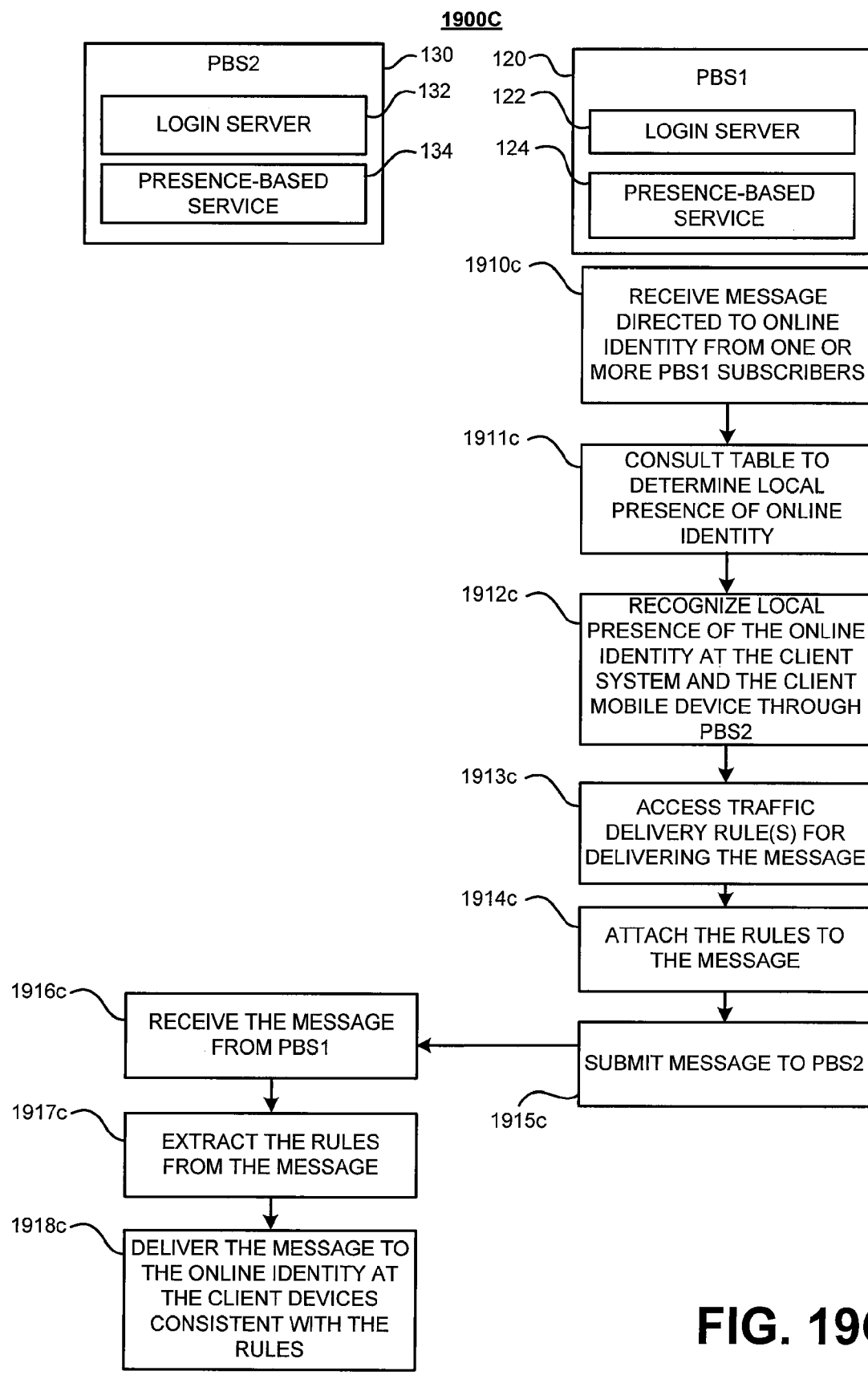

FIGS. 19A-19C show a few methods for communicating the traffic delivery rules hosted by PBS1 120 to PBS2 130. Referring to FIG. 19A, process 1900A may be used by PBS1 120 to communicate all the traffic delivery rules to PBS2 130. Process 1900A begins with PBS1 120 receiving a message directed to the online identity from one or more PBS1 120 subscribers (1910a). PBS1 120 consults its table to determine local presence of the online identity (1911a) and recognizes presence of the online identity at the client system 110 and the client mobile device 140 through PBS2 130 (1912a). PBS1 120 accesses traffic delivery rules for delivering the message (1913a) and submits the rules to PBS2 130 (1914a). Thereafter, PBS1 120 submits the message to PBS2 130 (1916a). PBS2 130 receives the rule(s) and the message from PBS1 120 (1915a and 1917a), and delivers the message to the online identity at the client devices 110 and 140 consistent with the rules (1918a).

Referring to FIG. 19B, in another implementation, PBS1 120 may communicate a subset of the rules based on the message or type of services into which the online identity is logged in, as shown by process 1900B. The actions (1910b-1913b) of process 1900B are the same as actions (1910a-1913a) of process 1900A, and, as such, they are not described here in more detail. Process 1900B also includes PBS1 120 submitting a subset of rules based on the message and/or the device type used to access the presence based service (1914b) and separately submitting the message to PBS2 130 (1916b). PBS2 130 receives the subset of the rules and the message (1915b and 1917b) and delivers the message to the online identity at the client devices 110 and 140 consistent with the rules (1918b).

Referring to FIG. 19C, in a different implementation, PBS1 120 may attach the rules to the message (1914c) and send the rules with the message to PBS2 130 (1915c). PBS2 130 receives the message (1916c), extracts the rules from the message (1917c), and sends the message to the online identity consistent with the rules (1918c). The actions (1910c-1913c) of process 1900C are the same as actions (1910a-1913a) of process 1900A and, as such, they are not described here in more detail. In yet another implementation, PBS1 120 may deliver the rules at the time it returns an indication of authentication to PBS2 130 for the online identity, as shown in FIG. 12.

In one specific example, rules hosted by PBS1 120 may include delivery of the traffic to user@PBS1.com according to the particular client device used to access the presence-based service 134 of PBS2 130 (e.g., sending the traffic to the online identity at the client system 110). The traffic delivery rules are first communicated to PBS2 130 according to one of the several methods described with respects to FIGS. 19A-19C. PBS2 130 consults the traffic delivery rules and consistent with the rules sends the message to user@PBS1.com at the client system 110. Thus, user@PBS1.com at the client mobile device 140 does not receive the message. Alternatively, the rules may require the delivery of the message to user@PBS1.com logged in to the PBS2 presence-based service 134 via the client mobile device 140. Thus, user@PBS1.com logged in via the client system 110 does not receive the message.

In another implementation, an online identity (e.g., user@PBS1.com) accesses a first presence-based service (e.g., PBS2 130) that is not associated with the domain of the online identity. The online identity may have a connection to a second presence-based service (e.g., PBS3) through the first presence-based service. Thereafter, user@PBS1.com receives, at the first presence-based service, a message from a PBS3 subscriber. The message may originate from PBS3 and may be delivered to PBS2 130. Upon receiving a message, PBS2 130 may need to access traffic delivery rules associated with the online identity in order to regulate delivery of the message to the online identity based on the traffic delivery rules. To do so, in one example, PBS2 130 requests the traffic delivery rules from a third presence-based service. The third presence-based service (e.g., PBS1 120) may be associated with the domain of the online identity. Alternatively, the third presence-based service may be a centralized service that includes traffic delivery rules for online identities (e.g., at all interoperable presence-based services). In another slightly modified scenario, instead of requesting the traffic delivery rules from the third presence-based service, PBS2 130 merely reports to the third presence-based service that the online identity has accessed PBS2 130 and in response, the third presence-based service publishes the traffic delivery rules to PBS2 130. In this implementation, as the traffic delivery rules changes PBS1 120 may publish the changes to PBS2 130. In either case, after receiving the traffic delivery rules from the third presence-based service, PBS2 130 regulates delivery of the traffic based on the traffic delivery rules.

FIG. 20 illustrates a traffic delivery rules database 2000 hosted by a presence-based system, e.g., PBS1 120. The traffic delivery rules may be customized for an individual. In one implementation, the traffic delivery rules may be customized for the operator of the client system using the online identity and, as such, the traffic delivery rules govern receipt of the message based on preferences of the online identity or the first presence-based service. Alternatively, the traffic delivery rules may be customized for a sender of the message and, as such, the traffic delivery rules regulate delivery of the message to the online identity based on preferences of the sender of the message or a presence-based service associated with the sender of the message.

The traffic delivery rules database 2000 may include rules for delivery of the traffic through one or more presence-based systems, as noted with respect to FIGS. 17A-17C. In addition, the traffic delivery rules database 2000 may include rules for delivery of traffic to a selected subset of online identities for one or more interoperating presence-based systems. For instance, the traffic delivery rules database 2000 may include rules for delivery of the traffic based on the client device the operator of the online identity uses to log into the PBS2 presence-based service 134, as noted above. Alternatively or additionally, the traffic delivery rules database 2000 may include rules for delivery of the traffic to one or more client devices at a particular time of day such that the traffic is received at the devices that the operator uses at a particular time of day. For example, as shown in FIG. 20, the traffic is sent to the online identity at the client mobile device between 7 am-9 am because the operator using the online identity is likely to be on his or her way to work during that time. Additionally, the traffic delivery rules database 2000 includes rules for delivery of the traffic to the client devices at which the online identity has an active presence according to presence information stored in the PBS1 presence based service 124 as shown in FIG. 16C. For example, the message may be delivered to the online identity at the client devices in which the online identity is not idle, away, or hidden.

Alternatively, the traffic delivery rules may include instructions for determining whether the online identity has a direct presence at a first presence-based service from which the message originates (in keeping with the above example PBS1 120 with respect to FIGS. 19A-19C), and in the absence of such direct presence, the traffic delivery rules include instructions for delivering the message to the online identity through a second presence-based service (e.g., PBS2 130). If such direct presence is determined to exists, the traffic delivery rules include instructions for delivering the message to the online identity through the first instant messaging service (e.g., PBS1 120). To have direct presence at the first presence-based service, in one example, the operator of the client system 110 has to directly login into the first presence-based service.

The traffic delivery rules database 2000 may also include rules regarding the priority of the message. For instance, if the message is urgent the traffic delivery rules may instruct the PBS2 presence-based service 134 to send the traffic to the online identity at all client devices.

In one specific example, EarthLink® and AOL® internet service providers represent PBS1 120 and PBS2 130, respectively, and EarthLink® IM and AOL® IM represent the presence-based services for PBS1 120 and PBS2 130, respectively. A client system operator using user@EarthLink.com logs into EarthLink® IM service through EarthLink® IM client at the client system. Later, but concurrently, the operator using user@EarthLink.com logs into AOL® IM service through an AOL® IM client at a client mobile device. For purpose of this example, we assume that AOL® recognizes the online identity as having presence directly through AOL® IM service and indirectly through EarthLink® IM service, e.g., via communications from EarthLink® to AOL® that results from interoperability between the services in response to user@Earthlink.com having logged into the EarthLink® IM service (shown in FIG. 13A-13B). Because a direct and an indirect presence are both recognized, when traffic from AOL® subscribers is directed to the user@EarthLink.com, AOL®, consistent with its traffic delivery rules, may have options of (1) sending the traffic through AOL®, such that the traffic is received by user@EarthLink.com at client devices through which user@EarthLink.com logged directly into AOL® IM service (e.g., the client mobile device in the scenario described above), (2) sending the traffic through Earth-Link,® such that the traffic is received by user@EarthLink.com at client devices through which the user@EarthLink.com logged directly into EarthLink® IM service (e.g., the client system in the scenario described above), and (3) sending the traffic to each of the AOL® and EarthLink®, such that it is received at clients for both services through which the user logged in.

A number of implementations have been described. Nevertheless, it will be understood that various modifications may be made. For example, while the foregoing techniques have been described with changes in presence, including online presence at a particular presence-based service and changes thereto, e.g., log in, log off, idle, away, and hide, the references made to changes in presence, additionally or alternatively, may be used to reference changes in presence at different device types, services, and/or processes. Thus, presence has been used to describe online presence generally, as well as the presence at one or more particular services, service provides, devices, or device types. Similarly, changes in presence has been used to describe changes in online presence generally, as well as the presence at one or more particular services, service providers, devices, or device types. Furthermore, while foregoing techniques have been described with an operator of client devices using an identity with the form username@domain, other forms may be used to access one or more interoperable presence-based services.

What is claimed is:

1. A computer-implemented method comprising the following operations performed by one or more processors:
   enabling access to a first instant messaging service using an online identity of a user that is associated with a second instant messaging service, wherein enabling access to the first instant messaging service comprises authenticating the online identity of the user;
   sending a request to receive publication rules, the publication rules comprising an identifier of at least one other instant messaging service in a list of interoperable instant messaging services, and data indicating that the at least one other instant messaging service associated with the identifier is permitted to receive presence information regarding the use of the online identity by the user to access the first instant messaging service;
   receiving the publication rules;
   consulting the publication rules to determine that the at least one other instant messaging service is permitted to receive presence information;
   providing, in response to consulting the publication rules and determining that the at least one other instant messaging service is permitted to receive presence information, the at least one other instant messaging service with the presence information regarding the use of the online identity to access the first instant messaging service;
   detecting new presence information for the online identity; and
   providing, to the at least one other instant messaging service, the new presence information and an identity of a type of client device used by the user.

2. The method of claim 1, wherein:
   the request for publication rules is sent from the first instant messaging service to the second instant messaging service; and
   the publication rules are received at the first instant messaging service from the second instant messaging service.

3. The method of claim 1, wherein:
   the request for publication rules is sent from the second instant messaging service to the first instant messaging service; and
   the publication rules are received at the second instant messaging service from the first instant messaging service.

4. The method of claim 1, wherein providing the at least one other instant messaging service with the presence information comprises sending the presence information from the first instant messaging service to the at least one other instant messaging service.

5. The method of claim 1, wherein providing the at least one other instant messaging service with the presence information comprises sending the presence information from the second instant messaging service to the at least one other instant messaging service.

6. The method of claim 1, wherein enabling access to the first instant messaging service using the online identity comprises communicating with the second instant messaging service to authenticate the online identity.

7. The method of claim 6, wherein communicating with the second instant messaging service to authenticate the online identity includes communicating with the second instant messaging service to authenticate the online identity without soliciting a user of the online identity.

8. The method of claim 1, wherein enabling access to the first instant messaging service using the online identity comprises communicating with the first instant messaging service to authenticate the online identity such that the first instant messaging service authenticates the online identity and provides the at least one other instant messaging service with the presence information associated with the online identity.

9. The method of claim 1, wherein enabling access to the first instant messaging service using the online identity comprises sending an authentication ticket to the client device from the second instant messaging service.

10. The method of claim 1, wherein enabling access to the first instant messaging service using the online identity comprises:
receiving a request for access to the first instant messaging service from the client device, the request including the online identity;
authenticating the online identity; and
providing the client device with access to the first instant messaging service upon authentication of the online identity.

11. The method of claim 1, wherein the at least one other instant messaging service includes the second instant messaging service.

12. The method of claim 1, wherein the online identity is expressed using a combination of a username and a domain name.

13. The method of claim 1, further comprising providing the presence information to subscribers associated with the first instant messaging service that have subscribed to the presence information.

14. The method of claim 13, wherein providing the presence information to subscribers includes providing the presence information to subscribers by the first instant messaging service independent from other instant messaging services.

15. The method of claim 13, wherein providing the presence information to subscribers includes providing the presence information to subscribers by the first instant messaging service in response to or at a direction of another instant messaging service.

16. The method of claim 1, wherein the presence information includes one or more of logging in, logging off, going idle, or going away.

17. The method of claim 1, wherein authenticating the online identity of the user comprises determining that the online identity is registered with the second instant messaging system.

18. The method of claim 1, wherein the list of interoperable instant messaging services includes interoperable instant messaging services permitted to receive presence information.

19. The method of claim 1, wherein the publication rules are associated with the online identity.

20. The method of claim 1, wherein the online identity associated with the second instant messaging service is different from an online identity associated with the first instant messaging service.

21. The method of claim 1, wherein the publication rules allow publication of presence information based on a domain information of the at least one other instant messaging service.

22. The method of claim 1, wherein the publication rules allow publication of presence information based on an interoperability between the first instant messaging service and the at least one other instant messaging service.

23. The method of claim 1, wherein the publication rules allow publication of presence information to more than one of the at least one other instant messaging service.

24. The method of claim 1, wherein the publication rules are maintained by the second instant messaging service in association with the online identity.

25. The method of claim 1, wherein the publication rules are maintained by the second instant messaging service and used for each of multiple online identities including the online identity.

26. The method of claim 1, wherein the publication rules are maintained by the first instant messaging service in association with the online identity.

27. The method of claim 1, wherein the publication rules are maintained by the first instant messaging service and used for each of multiple online identities including the online identity.

28. The method of claim 1, wherein the publication rules are maintained by the at least one other instant messaging service in association with the online identity.

29. The method of claim 1, wherein the publication rules are maintained by the at least one other instant messaging service and used for each of multiple online identities including the online identity.

30. A non-transitory computer-usable medium storing a computer program, the computer program comprising instructions for causing at least one processor to perform the following operations:
enabling access to a first instant messaging service using an online identity of a user that is associated with a second instant messaging service, wherein enabling access to the first instant messaging service comprises authenticating the online identity of the user;
sending a request to receive publication rules, the publication rules comprising an identifier of at least one other instant messaging service in a list of interoperable instant messaging services, and data indicating that the at least one other instant messaging service associated with the identifier is permitted to receive presence information regarding the use of the online identity by the user to access the first instant messaging service;
receiving publication rules;
consulting the publication rules to determine that the at least one other instant messaging service is permitted to receive presence information;
providing, in response to consulting the publication rules and determining that the at least one other instant messaging service is permitted to receive presence information, the at least one other instant messaging service with the presence information regarding the use of the online identity to access the first instant messaging service;
detecting new presence information for the online identity; and providing, to the at least one other instant messaging service, the new presence information and an identity of a type of client device used by the user.

31. The medium of claim 30, wherein:
the request for publication rules is sent from the first instant messaging service to the second instant messaging service; and
the publication rules are received at the first instant messaging service from the second instant messaging service.

32. The medium of claim 30, wherein:
the request for publication rules is sent from the second instant messaging service to the first instant messaging service; and
the publication rules are received at the second instant messaging service from the first instant messaging service.

33. The medium of claim 30, wherein providing the at least one other instant messaging service with the presence information comprises:
sending the presence information from the first instant messaging service to the at least one other instant messaging service.

34. The medium of claim 30, wherein providing the at least one other instant messaging service with the presence information comprises:
sending the presence information from the second instant messaging service to the other instant messaging service.

35. The medium of claim 30, wherein enabling access to the first instant messaging service using the online identity comprises:
communicating with the second instant messaging service to authenticate the online identity.

36. The medium of claim 30, wherein enabling access to the first instant messaging service using the online identity comprises communicating with the first instant messaging service to authenticate the online identity, whereby the first instant messaging service authenticates the online identity and provides the at least one other instant messaging service with the presence information associated with the online identity.

37. The medium of claim 30, wherein enabling access to the first instant messaging service using the online identity comprises
sending an authentication ticket to the client device from the second instant messaging service.

38. The medium of claim 30, wherein enabling access to the first instant messaging service using the online identity comprises
receiving a request for access to the first instant messaging service from the client device, the request including the online identity;
authenticating the online identity; and
providing the client device with access to the first instant messaging service upon authentication of the online identity.

39. The medium of claim 30, wherein the online identity associated with the second instant messaging service is different from an online identity associated with the first instant messaging service.

* * * * *